United States Patent [19]
Morita et al.

[11] Patent Number: 5,738,602
[45] Date of Patent: Apr. 14, 1998

[54] OIL PRESSURE CONTROL SYSTEM FOR AUTOMATIC VEHICLE TRANSMISSION

[75] Inventors: Yukio Morita; Tsunefumi Niiyama, both of Wako, Japan

[73] Assignee: Honda Giken Kogyo Kabushiki Kaisha, Tokyo, Japan

[21] Appl. No.: 734,597

[22] Filed: Oct. 22, 1996

[30] Foreign Application Priority Data

Oct. 24, 1995 [JP] Japan ................... 7-299050

[51] Int. Cl.$^6$ .............. F16H 61/04; F16H 61/08
[52] U.S. Cl. ........................... 475/127; 477/906
[58] Field of Search ................... 475/127, 128; 477/906

[56] References Cited

U.S. PATENT DOCUMENTS

| | | | |
|---|---|---|---|
| 4,995,285 | 2/1991 | Hayakawa et al. | 477/906 |
| 5,014,577 | 5/1991 | Takada et al. | 477/906 |
| 5,083,481 | 1/1992 | Smith et al. | 477/906 |
| 5,337,625 | 8/1994 | Jang | 477/906 |
| 5,399,130 | 3/1995 | Long | 477/906 |
| 5,445,578 | 8/1995 | Koenig et al. | 477/906 |
| 5,509,868 | 4/1996 | Eaton | 477/906 |

*Primary Examiner*—Dirk Wright
*Attorney, Agent, or Firm*—Nikaido, Marmelstein, Murray & Oram LLP

[57] ABSTRACT

A system for controlling oil pressure of an automatic vehicle transmission having a plurality of fictional engaging elements (K1, K2, K3, B 1, B2) installed in the transmission for establishing a gear, a plurality of solenoid valves (SA and SE) at least one (SA) of which opens to supply the pressurized oil to at least one (K1) of the frictional engaging elements. The system also as a manual valve (20) whose spool moves in response to the selection of the selector lever for supplying the pressurized oil to the frictional engaging element bypassing the solenoid valve when the shift lever selects another gear range (1) in case of solenoid valve failure, and an underdrive engage control valve (30, 96) placed between the frictional engaging element and the switching valve for regulating pressure of the pressurized oil to be supplied to the frictional engaging. element in response to the pressurized oil outputted from the solenoid valve. In the system the underdrive engage control valve regulates the pressure of the pressurized oil to be supplied to the frictional engaging element in response to the pressurized oil supplied from the switching valve.

18 Claims, 20 Drawing Sheets

FIG.2

| GEARS | K1 | K2 | K3 | B1 | B2 | GEAR RATIOS |
|---|---|---|---|---|---|---|
| 1st | ◯ | | | | (◯) | 3.577 |
| 2nd | ◯ | | | ◯ | | 2.100 |
| 3rd | ◯ | | ◯ | | | 1.400 |
| 4th | ◯ | ◯ | | | | 1.000 |
| 5th | | ◯ | ◯ | | | 0.711 |
| RVS | | | ◯ | | ◯ | 2.953 |

FIG.5

| GEARS | SOLENOID VALVES | | | | |
|---|---|---|---|---|---|
| | SA | SB | SC | SD | SE |
| 1st | OFF | OFF | ON | OFF | OFF (ON FOR ENGINE BRAKING EFFECT) |
| 2nd | OFF | OFF | ON | ON | OFF (ON FOR LOCK-UP) |
| 3rd | OFF | OFF | OFF | OFF | OFF (ON FOR LOCK-UP) |
| 4th | OFF | ON | ON | OFF | OFF (ON FOR LOCK-UP) |
| 5th | ON | ON | OFF | OFF | OFF (ON FOR LOCK-UP) |
| RVS | OFF | OFF | OFF | OFF | OFF |

FIG.14

| IF SOLENOID VALVE SA STICKS TO STAY OPEN | IST TO 4TH GEAR POSSIBLE IN D RANGE |
|---|---|
| IF SOLENOID VALVE SA STICKS TO STAY CLOSED | IST TO 4TH GEAR POSSIBLE IN IST RANGE |

FIG.18

| | K1' | K2' | K3' | B1' | B2' | A' | B' | C' | D' | E' |
|---|---|---|---|---|---|---|---|---|---|---|
| | | | | | | SOL | | | | |
| 1st | ○ | — | — | — | ⊗ (TO BE ENGAGED FOR ENGINE BRAKING EFFECT) | OFF | OFF | ON | OFF | OFF (ON FOR ENGINE BRAKING EFFECT) |
| 2nd | ○ | — | — | ○ | — | OFF | OFF | ON | ON | OFF (ON FOR LOCK-UP) |
| 3rd | ○ | — | ○ | — | — | OFF | OFF | OFF | OFF | OFF (ON FOR LOCK-UP) |
| 4th | ○ | ○ | — | — | — | OFF | ON | ON | OFF | OFF (ON FOR LOCK-UP) |
| 5th | — | ○ | ○ | — | — | ON | ON | OFF | OFF | OFF (ON FOR LOCK-UP) |
| RVS | — | — | ○ | — | ○ | OFF | OFF | OFF | OFF | OFF |

5,738,602

OIL PRESSURE CONTROL SYSTEM FOR AUTOMATIC VEHICLE TRANSMISSION

BACKGROUND OF THE INVENTION

1. Field of the Invention

The present invention relates to an oil pressure control system for an automatic vehicle transmission, and in particular relates to a system for controlling the supply of operating oil pressure to frictional engaging elements used for establishing gear changes or gear shifting in an automatic transmission mounted in a vehicle.

2. Description of the Related Art

In an automatic vehicle transmission which includes a plurality of gear trains having different gear ratios, the engagement or disengagement (release) of frictional engaging elements such as hydraulic clutches or brakes and some similar elements is controlled through operating oil pressure to enable a gear (gear ratio) to be selected from among the plurality of gear trains, whereby the output of the engine is transmitted to the vehicle FIG. 17 shows an oil pressure control circuit of a prior art oil pressure control system for an automatic vehicle transmission like that described above. In such a prior art system, a plurality of solenoid valves (A' to E') are provided to directly control the supply of operating oil pressure to each of the frictional engaging elements made up of hydraulic clutches K1', K2', K3' and hydraulic brakes B1', B2' in order to control gear changes or gear shifting. This can be understood from the following description taking as an example the engagement of the frictional engaging element, i.e., the hydraulic clutch K1'.

FIG. 18 shows the engaging/disengaging state of each of the frictional engaging elements of the oil pressure circuit in each gear (circles mean engagement and bars mean disengagement). The right half portion of FIG. 18 shows the energization (ON) and deenergization (OFF) state of the electromagnetic solenoid provided for each solenoid valve. As shown in FIG. 18, only the frictional engaging element (clutch) K1' is brought into engagement to establish first gear (1st).

Now, the supply of operating oil to K1' for establishing first gear will be explained as example with reference to FIG. 17. The operating oil, pumped by an oil pump 510 from the oil reservoir, which has undergone a prescribed line pressure adjustment at a regulator valve 512 passes through an oil path 514 and reaches the solenoid valve A'. As illustrated in FIG. 18, the solenoid valve A' should be deenergized to establish 1st gear. The solenoid valve A' is a "normal-open type" one (i.e., the valve is open when OFF (i.e., deenergized) and closed when ON (i.e., energized)). The operating oil therefore passes through the solenoid valve A' and flows through an oil path 516 to a manual valve 518. A spool 520 of the manual valve 518 is placed in position shown in FIG. 17 when a selector lever (not shown) installed in the vicinity of the driver's seat is in the N (neutral) or P (parking) range.

When the selector lever is switched to the D (drive) range, the spool 520 of the manual valve 518 moves from the position shown in the drawing toward the fight into the position corresponding to the D range, an oil path 516 communicates with an oil path 522, and the operating oil is supplied to the frictional engaging element K1' positioned at the end terminal of the oil path 522 to engage the frictional engaging element K1'. As explained in FIG. 18, in order to establish 1st gear, the electromagnetic solenoids of the other three solenoid valves B', D', E' should be tamed to OFF while the solenoid valve C' should be switched to ON, and the other frictional engaging elements K2', K3', B1', B2' must be disengaged.

In the oil pressure circuit of the prior art system shown in FIG. 17, the supply of operating oil to the frictional engaging element K1' is directly controlled by the solenoid valve A' when the manual valve 518 is at the D range position. As a result, if the solenoid valve A' would malfunction, it is not possible to switch to any gear other than the highest gear.

In the case where solenoid valves are provided in the prior art oil pressure control system of an automatic vehicle transmission, with gear changes or gear shifting being carried out by controlling the supply of operating oil to each frictional engaging element by the oil pressure outputted from or passing through the solenoid valves, if a malfunction or defect occurs in one solenoid valve(s), it become impossible to shift into a prescribed gear, which in turn makes it impossible to properly operate the vehicle.

One proposed technology to overcome such problems involves supplying operating oil to the frictional engaging elements directly from the manual valve, without the use of solenoid valves, provided that the manual valve is switched to the lowest range position (i.e., the so-called "D1" range in which only 1st gear can be established). A description of this will now be given with reference to FIG. 19 and FIG. 20.

FIG. 19 and FIG. 20 show each a portion of a single oil pressure control circuit. In each of these drawings, the end terminals which are identified by the encircled double letters indicate that the circuit is connected to the circuit in the other drawing at the points identified by the same encircled double letters. The oil pressure control circuit shown in FIGS. 19 and 20 is also provided with similar solenoid valves (A" to E") and similar frictional engaging elements (K1", K2", K3", B1" and B2").

The engaging or disengaging states in each gear of each frictional engaging element in the oil pressure control circuit shown in FIGS. 19 and 20 correspond to those previously shown in FIG. 18. In order to establish 1st gear, only the frictional engaging element K1" should be engaged.

Again taking as example supply of operating oil to the frictional engaging element K1", the pressurized operating oil pumped by an oil pump 610 from the oil reservoir is reduced to a prescribed line pressure through a regulator valve 612 and after passing through an oil path 614 reaches a manual valve 616 (shown in FIG. 20). In FIG. 20, a spool 618 of the manual valve 616 is in the N, P range position. When it is moved two positions to the fight to the first range position (shown as "1" in the drawing), the oil path 614 communicates with an oil path 620 and this enables the operating oil to reach an underdrive engage control valve 622, whereby communication is established between an oil path 624 and the oil path 626 in the first range position, thereby supplying operating oil to the frictional engaging element K1".

At the same time, when the manual valve 616 is switched to the first range position, no operating oil pressure is supplied to the frictional engaging elements K2", K3", B1" to keep them in the disengaged state, while operating oil pressure is supplied to the frictional engaging element B2" to bring the same in the engaging state and as a result, 1st gear is established (detailed explanation omitted).

In this way, if the manual valve 616 is switched to the first range position in the oil pressure circuit of the oil pressure control system of the automatic transmission shown in FIGS. 19 and 20, operating oil pressure is supplied directly to the frictional engaging element K1" without passing through or bypassing the solenoid valve. Accordingly, it is possible to avoid the problem of not being able to establish any gear except the highest gear due to the malfunction of the solenoid valve A" described previously for a system like that shown in FIG. 17.

It should be noted here that any terms indicative of a direction such as "right" "left" "upper" "downward" are used in this specification to mean the direction viewed in the drawings.

In the oil pressure control circuit of the prior art oil pressure control system of the automatic transmission shown in FIGS. 19 and 20, the underdrive engage control valve 622 is provided to alleviate the shock that occurs at the time the frictional engaging element K1" is engaged.

However, when using the underdrive engage control valve 622 shown in the drawings, since the operating oil pressure supplied to the frictional engaging element K1" via the oil path 624 is adjusted by the flow rate through an orifice 628, the operation is disadvantageously unstable against fluctuations in oil temperature. Thus, since it is not possible to regulate the oil pressure supplied to the fictional engaging element K1" to a desired value, it becomes extremely difficult to achieve high quality gear changes or gear shifting.

Still another prior art system disclosed in Japanese Laid-Open Patent Application No. Hei 1 (1989)-299351 teaches technology in which operating oil is directly supplied to a frictional engaging element B-2 in order to establish first gear when the gear range is shifted from N (neutral) range to L (first gear) range using a low modulator valve 11 provided midway to guide the feedback oil pressure, this making it possible to regulate the supplied oil pressure. However, this technology does not provide a way to adjust supplied oil pressure more precisely or appropriately, thus leaving much to be improved.

SUMMARY OF THE INVENTION

In order to overcome the problems of the prior art systems described above, it is an object of the present invention to provide an oil pressure control system for an automatic vehicle transmission which can more appropriately or precisely control the supply of oil pressure to fictional engaging elements using a valve for regulating the supply of oil pressure to one or all of the frictional engaging elements and, when a malfunction should occur in the valve for regulating the supply of operating oil pressure to the frictional engaging elements, which can directly supply operating oil pressure to such frictional engaging elements without having to pass through or bypassing the malfunctioning valve such that at least a gear is established for the vehicle to keep running.

In order to achieve the object, the invention provides in one aspect a system for controlling oil pressure of an automatic transmission mounted on a vehicle, including a selector lever for selecting one among a plurality of gear ranges in the transmission, a plurality of frictional engaging elements installed in the transmission for establishing a gear in a gear train in the selected gear range, an oil pump for pumping oil from an oil reservoir to generate pressurized oil, a plurality of solenoid valves at least one of which opens to supply the pressurized oil to at least one of the frictional engaging elements, a switching valve whose spool moves in response to the selection of the selector lever for supplying the pressurized oil to the frictional engaging element outputted from the solenoid valve when the shift lever selects one gear range, while supplying the pressurized oil to the frictional engaging element bypassing the solenoid valve when the selector lever selects another gear range, and a regulating valve placed between the frictional engaging element and the switching valve for regulating pressure of the pressurized oil to be supplied to the frictional engaging element in response to the pressurized oil outputted from the solenoid valve. In the system it is configured such that the regulating valve regulates the pressure of the pressurized oil to be supplied to the frictional engaging element in response to the pressurized oil supplied from the switching valve.

BRIEF DESCRIPTION OF THE DRAWINGS

The above and other objects and advantages of the invention will be more apparent from the following description and drawings, in which:

FIG. 2 is a table showing the engaged or disengaged states of frictional engaging elements, i.e., hydraulic clutches and brakes for establishing five forward gears and one reverse gear in the automatic transmission illustrated in FIG. 1;

FIG. 5 is a table showing the energization (ON) state and the deenergization (OFF) state of the solenoid valves in each gear;

FIG. 14 is a table showing gear possible in the case of malfunction of the solenoid valve;

FIG. 18 is a table showing the state of engagement/ disengagement of frictional engaging elements and energization/deenergization of solenoid valves in each gear used in the circuit shown in FIG. 17;

DETAILED DESCRIPTION OF THE PREFERRED EMBODIMENTS

With reference to the appended drawings, a detailed description of the preferred embodiments will be given below.

Figure 1:
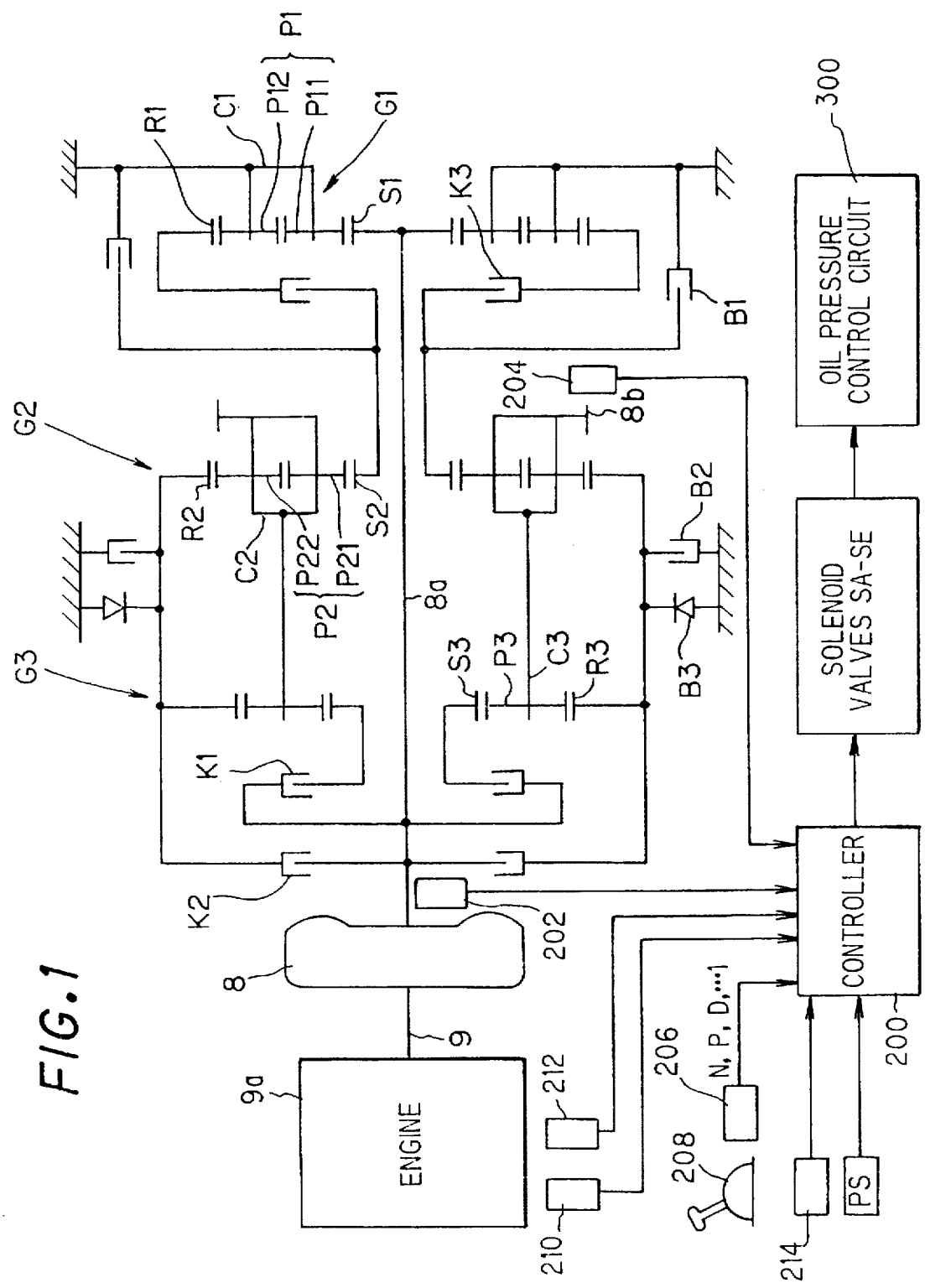
FIG. 1 is a schematic diagram showing an oil pressure control system for an automatic vehicle transmission according to the present invention.

FIG. 1 is a schematic diagram showing an oil pressure control system for an automatic vehicle transmission according to the present invention.

This automatic transmission has a hydraulic torque converter 8 whose pump (not shown) is connected to an engine output shaft 9 of an internal combustion engine 9a and whose turbine (not shown) is connected to a transmission input shaft 8a and first, second and third planetary gear trains G1, G2, G3 provided in a parallel arrangement on the transmission input shaft 8a.

The planetary gear trains G1, G2, G3 are each constructed from centrally positioned first, second and third sun gears S1, S2, S3; first, second and third revolving planetary pinions P1, P2, P3 which mesh with the first, second and third sun gears S1, S2, S3 to rotate therearound; first, second and third carriers C1, C2, C3 which hold the pinions P1, P2, P3 to enable free rotation thereof while rotating in the same way that the pinions revolve; and first, second and third ring gears R1, R2, R3 which include inner teeth to mesh with the pinions P1, P2, P3.

The first planetary gear train G1 and the second planetary gear train G2 are double-pinion type planetary gear trains, and as shown in the diagram, the first pinion P1 and the second pinion P2 are each constructed from two pinion gears P11, P12 and P21, P22.

The first sun gear S1 is normally connected to the transmission input shaft 8a, and the first carrier C1 is normally fixed. The first ring gear R1 is connected to the second sun gear S2 via a third hydraulic clutch K3, and it is possible to hold the second sun gear S2 by a first brake B1. The second carrier C2 is connected to the third carrier C3 and an output gear 8b, whereby the rotation of the second carrier C2 and the third carrier C3 forms the output rotation of the transmission. The second ting gear R2 is directly connected to the third ring gear R3 such that the gears R2 and R3 as a whole can be held by a second brake B2 and mounted on the transmission input shaft 8a to be engaged thereon by a second clutch K2. The third sun gear S3 is mounted on the transmission input shaft 8a to be engaged thereon by a first clutch K1. A one-way brake B3 is placed in a parallel arrangement with the second brake B2.

In the above-described transmission comprising first to third sun gears S1 to S3, first to third carriers C1 to C3, and first to third ring gears R1 to R3, the transmission input shaft 8a and the output gear 8b, it is possible to control the establishment of a gear and the shifting to another gear by engaging or disengaging the frictional engaging elements made up of the first to third clutches K1 to K3 and the first and second brakes B1 and B2. More specifically, when the frictional engaging elements are controlled to be engaged or disengaged as shown in FIG. 2, it is possible to establish five forward gears (1st, 2nd, 3rd, 4th and 5th) and one reverse gear (RVS). Although the reduction gear ratios for each gear vary with the number of teeth of each gear, one possible example is illustrated in FIG. 2.

In FIG. 2, the parentheses around the second brake B2 for 1st gear indicate that even when the brake B2 is not engaged, power transfer takes place by the oneway brake B3. Specifically, even when the second brake B2 is not brought into operation, if the first clutch K1 is engaged, it is possible to establish 1st gear and thereby transfer power at the 1st gear ratio. More specifically, when the second brake B2 is operated, 1st gear is established carrying the engine braking effect. In the case that 1st gear is established without bringing that second brake B2 into engagement, no engine braking effect is obtained since it is not possible to transmit the power from the wheel in that case, even though 1st gear is established.

In order to control the supply of oil pressure to these frictional engaging elements, there is provided a controller 200 made of a microcomputer which receives outputs of a speed sensor 202 made of a magnetic pickup and installed in the vicinity of the transmission input shaft 8a for detecting a transmission input shaft speed, a speed sensor 204 similarly made of a magnetic pickup and installed in the vicinity of the output gear 8b for detecting a transmission output shaft speed, a selector lever switch 206 connected to a selector lever 208 positioned in the vicinity of the driver's seat for detecting one among gear ranges selected by the driver.

In addition, the controller 200 receives outputs of an engine speed sensor 210 installed in the vicinity of the crank shaft (not shown) of the engine 9a for detecting the engine speed, a throttle position sensor 212 installed in the vicinity of a throttle valve (not shown) for detecting the engine load through an opening degree of the throttle valve and a vehicle speed sensor 214 installed in a drive shaft (not shown) for detecting the traveling speed of the vehicle in which the automatic transmission is mounted. Based on the parameters thus detected, the controller 200 energizes (ON) or deenergizes (OFF) solenoid valves SA to SE to controls the supply of oil pressure to the frictional engaging elements through oil pressure control circuit 300 as will be explained later. The oil pressure in the circuit 300 is detected by five pressure sensors PS as will be explained later and outputs thereof are sent to the controller 200.

Figure 3:
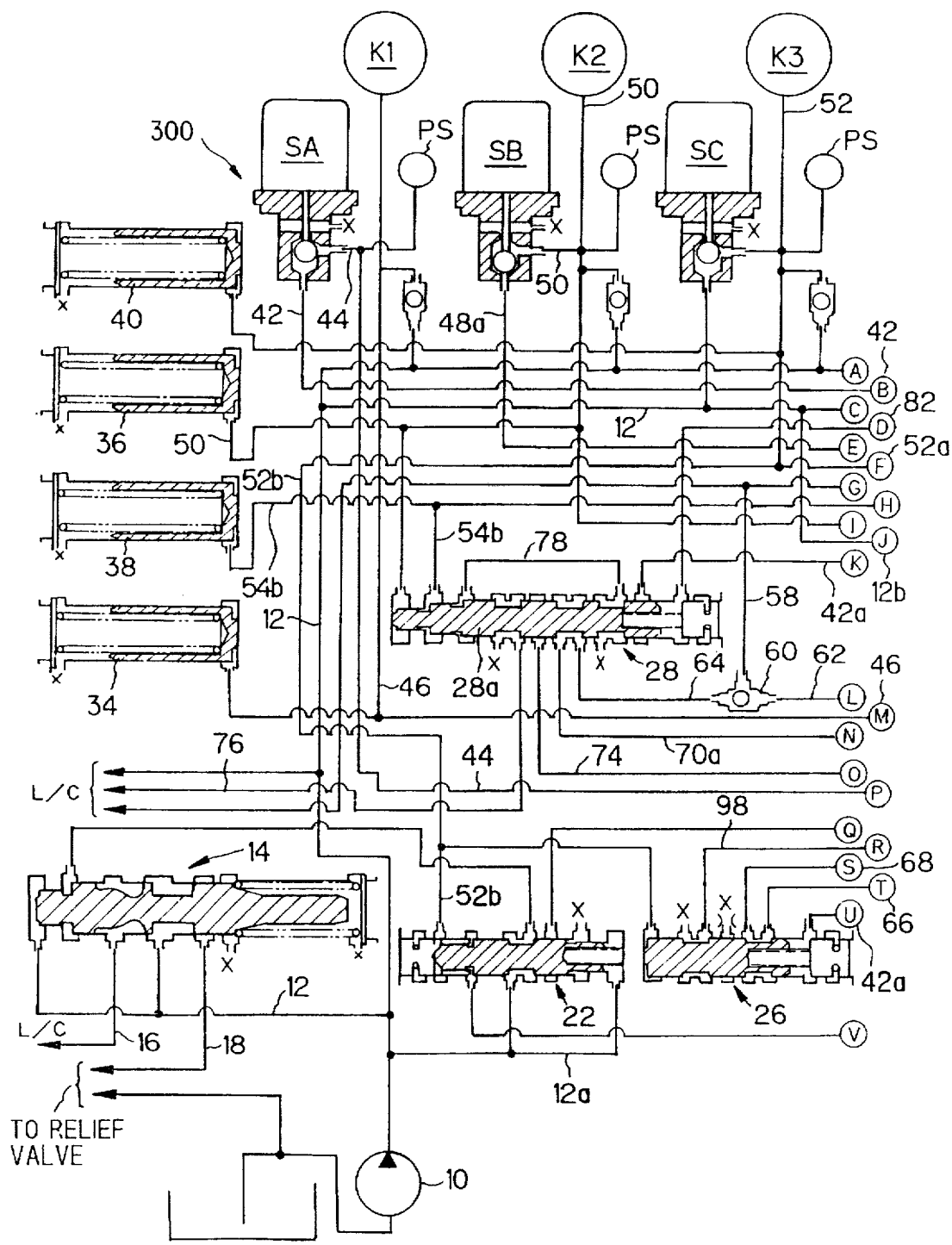
FIG. 3 is a detailed circuit diagram showing a first half of the oil pressure control circuit in the oil pressure control system according to the invention as illustrated in FIG. 1.
Figure 4:
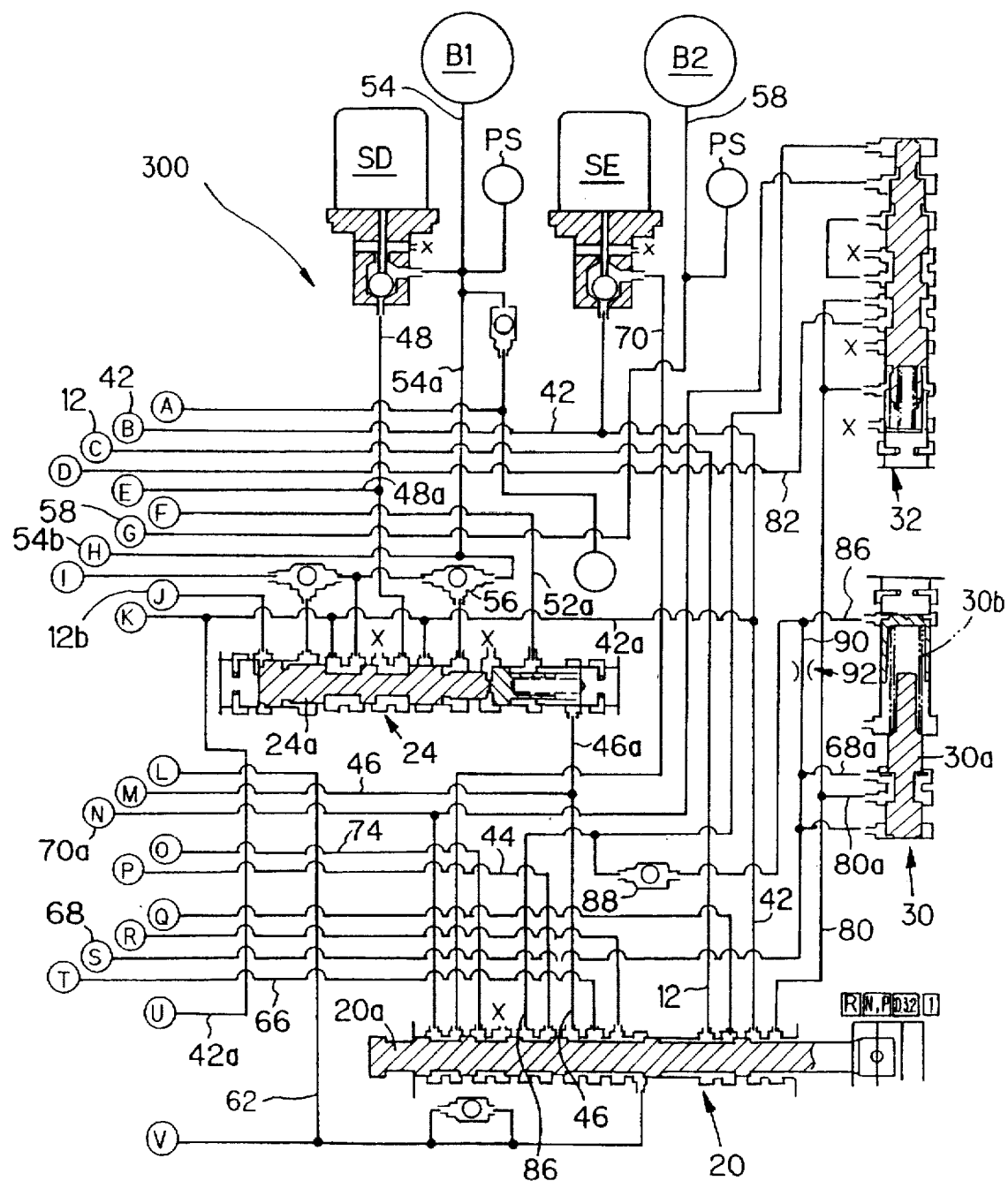
FIG. 4 is a view, similar to FIG. 3, but showing a second half of the oil pressure control circuit used in the system according to the invention.

Next, with reference to FIGS. 3 and 4, a description will be given for the oil pressure control circuit 300 for engaging and disengaging of the first to third clutches K1 to K3 and the first and second brakes B1 and B2. FIGS. 3 and 4 show portions of the oil pressure control circuit 300. In each of the drawings, the end terminals of the oil paths indicated by encircled letters indicate where such oil paths connect to the oil paths in the other drawing. Further, the symbol "x" in the drawings indicates the ports that are open for draining.

The operations of the brakes and clutches for controlling gear smiling are made by utilizing oil pressure from the operating oil supplied from the oil reservoir shown in the bottom portion of FIG. 3 by an oil pump 10. The operating oil which is pumped into an oil path 12 from the pump 10 is adjusted by a regulator valve 14 to have a prescribed line pressure. When operating oil is pumped out by the pump 10, a portion of such oil will be supplied to the oil path 12, with the remainder thereof being sent out through the regulator valve 14 to an oil path 16. The operating oil which is sent to the oil path 16 is then supplied for controlling the lockup clutch of the torque converter (not shown). Operating oil which is sent to an oil path 18 is returned to the oil reservoir via a relief valve (not shown).

The operating oil in the oil path 12 which has been adjusted to have the line pressure like that described above is supplied to the relevant parts of the oil pressure control circuit to be used for controlling gear shifting in the automatic transmission. Arranged among such parts are a manual valve 20 which is connected to the selector lever 208 arranged in the vicinity of the driver's seat to enable operations, the five solenoid valves SA to SE which are controlled to be energized (ON) or deenergized (OFF) by the aforesaid controller depending on parameters including the driver's manual range selection by a controller (not shown), six hydraulically operated valves 22, 24, 26, 28, 30, 32 which operate in response to the operation of the manual valve 20 and the energization deenergization of the solenoid valves SA to SE, four accumulators 34, 36, 38, 40, and the five oil pressure sensors PS.

The solenoid valves SA and SC are normal-open-type valves, which are open when the electromagnetic solenoids provided therein are OFF (deenergized). On the other hand, the solenoid valves SB, SD and SE are normal-closed-type valves, which are closed when the electromagnetic solenoids provided therein are OFF. Through the supply of operating oil by the valves 20, SA to SE, 22, 24, 26, 28, 30, 32, the controller 200 controls gear shifting and the operations of the lockup clutch of the torque converter are controlled. FIG. 2 shows the relationship between the operation of each solenoid valve SA to SE and the gears which are established in response to such operations. FIG. 5 refers to the ON (energization) and OFF (deenergization) states of the electromagnetic solenoids of each of the solenoid valves SA to SE. The controller 200 controls solenoids based on a duty ratio (Pulse Width Modulation, i.e., the ON time in a pulse train (current)) so as to make it possible to obtain a desired gear shifting characteristic.

A description will now be given for the gear shifting control.

First, a description will be given for the case in which the D range is selected using the selector lever such that a spool 20a of the manual valve 20 is moved to the position corresponding to the D range.

Namely, as shown in FIG. 4, when the hook portion at the right end of the spool 20a is moved to the right to the position indicated by D3 or D2, it establishes communication between an oil path 42 and the oil path 12 which is supplied with operating oil adjusted to have the line pressure like that described above. Furthermore, since the oil path 12 is connected with the solenoid valve SC (shown in FIG. 3) and since the oil path 42 is communicating with the solenoid valve SE, the line pressure always acts on the solenoid valve SC and the solenoid valve SE. Moreover, since the oil path 42 is also communicating with the solenoid valve SA, the line pressure always acts on the solenoid valve SA.

An oil path 12a which branches out from the oil path 12 is communicating with the right end oil chamber of a reverse pressure switching valve 22, an oil path 12b which branches out from the oil path 12 is communicating with a left end oil chamber of a pressure release valve 24, and an oil path 42a which branches out from the oil path 42 is communicating with the fight end oil chamber of an out-gear control valve 26. Consequently, the line pressure causes the reverse pressure switching valve 22 and the out-gear control valve 26 to be normally pushed to the left and the pressure release valve 24 to be normally pushed to the right.

Now, in the case where the D range position is selected, the controller 200 determines a gear in response to the load on the engine and the speed of the vehicle, and in order to obtain such a gear, the control operations of each of the solenoid valves SA to SE are shown in FIG. 5.

Next, a description will be given for the operations of the clutches and brakes that accompany the operations of the solenoid valves for each gear.

First, a description will be given for the case in which first gear (1st) is to be established.

In this case, as shown in FIG. 5, the solenoid SC is the only solenoid valve in the ON state; namely, the other four solenoid valves SA, SB, SD and SE are in the OFF state. Accordingly, only the solenoid valve SA is open and the other four solenoid valves are closed. Since the line pressure from the oil path 42 acts on the solenoid valve SA, the operating oil which has this line pressure passes through the solenoid valve SA and reaches the manual valve 20 via an oil path 44. When the spool 20a of the manual valve 20 is in the D range position, the oil path 44 communicates with an oil path 46, whereby operating oil at line pressure is supplied to the first clutch K1 via the oil path 46 to bring the first clutch K1 into engagement. The oil path 44 is connected to the oil pressure sensor PS. Further, the oil path 46 is communicating with the right end of the accumulator 34, whereby the accumulator 34 can suppress sudden rises in operating oil pressure supplied to the first clutch K1 so as to lessen the accompanying shock.

Further, the oil path 46 acts on the right end of the pressure release valve 24 via an oil path 46a. On the other hand, line pressure acts on the left end portion of the pressure release valve 24 via the oil path 12b, but since the operating oil pressure that acts via the oil path 12b is higher due to the difference of surface areas at which the pressure acts, a spool 24a of the pressure release valve 24 moves to the right away from the position shown in the drawing, whereby communication is established between the oil path 42a which branches off from the oil path 42 and an oil path 48 which is connected to the solenoid valve SD.

On the other hand, an oil path 50 which is connected to the second clutch K2 is connected to the output port of the solenoid valve SB. Since, however, this solenoid valve SB is closed, the oil path 50 is connected to the drain through the solenoid valve SB, thereby rendering the second clutch K2 disengaged. The oil path 50 is connected to the oil pressure sensor PS and the right end of the second accumulator 36.

An oil path 52 which is connected to the third clutch K3 is connected to the right end oil chamber of the pressure release valve 24 via an oil path 52a and is further connected to the left end oil chamber of the reverse pressure switching valve 22 via an oil path 52b. The oil path 52 is also connected to the output port of the solenoid valve SC. Since the solenoid valve SC is closed, as mentioned above, the oil path is connected to the drain through the solenoid valve SC. For this reason, the third clutch is also kept in the disengaged or released state. Further, the oil path 52 is connected to the oil pressure sensor PS and the fight end portion of the fourth accumulator 40.

An oil path 54 which is connected to the first brake B1 is connected to the output port of the solenoid valve SD. Since the solenoid valve SD is closed, the oil path 54 is connected to the drain through the solenoid valve SD, whereby the first brake B1 is also in the disengaged or released state. Further, an oil path 54a which branches off from the oil path 54 is connected to the right end portion of the pressure release valve 24 via a shuttle valve 56 and is further connected to the left end portion of a pressure delivery valve 28 via an oil path 54b. The oil path 54 is connected to the oil pressure sensor PS, and the oil path 54b is connected to the fight end portion of the third accumulator 38.

An oil path 58 which is connected to the second brake B2 is connected to either an oil path 62 or an oil path 64 via a shuttle valve 60. The oil path 62 communicates with an oil path 66 by the manual valve 20, and the oil path 66 communicates with an oil path 68 by the out-gear control valve 26. The oil path 68 is connected to the underdrive engage control valve 30. However, when the manual valve 20 is in the D range position, no operating oil is supplied to the underdrive engage control valve 30, so no operating oil is supplied to the oil path 58 via the oil path 66. An oil path 64 communicates with an oil path 70a by the pressure delivery valve 28, and the oil path 70a reaches the manual valve 20, but is closed when the valve is in the D range position.

As a result, no operating oil controlled by the solenoid valve SE is supplied to the second brake B2, and so the second brake B2 is also brought into disengagement. Accordingly, no engine braking effect can be achieved for first gear in the D range position.

Next, shifting to the second gear will be explained.

In this case, the only switching operation to take place is the switching of the solenoid valve SD from its OFF state to the ON state. Thus, the only difference from the state described above for first gear is that the solenoid valve SD is opened. The first clutch K1 has been kept engaged. On the other hand, the spool 24a of the pressure release valve 24 is moved to the fight due to the operating oil at line pressure being supplied to the left portion of the pressure release valve 24 via the oil path 12b. Accordingly, the operating oil at line pressure which reaches the pressure release valve 24, from the manual valve 20 via the oil path 42 and the oil path 42a, reaches the solenoid valve SD via the oil path 48. Since the solenoid valve SD is open, operating oil pressure is supplied to the first brake B1, thereby bringing the first brake B1 into the engagement state. At this time, the third accumulator 38 acts to alleviate the accompanying shock. The first clutch K1 and the first brake B1 are thus engaged to establish the 2nd gear.

Further, with the solenoid valve SD in the open state, the line pressure acts at the left of the pressure delivery valve 28 via the oil paths 54, 54a, 54b, and this causes a spool 28a of the pressure delivery valve 28 to move to the fight. As a result, an oil path 74 and an oil path 76, which are connected to the above-mentioned lockup clutch control circuit, communicate with each other at the pressure delivery valve 28. At the manual valve 20, the oil path 74 communicates with an oil path 70 which is connected to the output port of the solenoid valve SE. Accordingly, as indicated by the parentheses in FIG. 5, when the solenoid valve SE is turned to ON, the pressure outputted therefrom can be used to control the lockup clutch.

Upon rightward movement of the spool 28a of the pressure delivery valve 28, communication is established between the oil path 42a and an oil path 78, and this enables the line pressure to act on the left end of the pressure delivery valve 28 to maintain the spool 28a in such position to the fight even when the line pressure from the oil path 54b no longer acts on the left end of the pressure delivery valve 28.

Next, a description will be given for the case in which gear shifting is carried out to establish third (3rd) gear.

In this case, the solenoid valves SC and SD are to be switched from their ON state to the OFF state in order to make all the solenoid valves SA to SE to be in the OFF state. In this manner, from the state described above for 2nd gear, the solenoid valve SC is changed to be open while the solenoid valve SD is changed to be closed. Since the solenoid valve SA is kept open, the first clutch is left engaged. Since the solenoid valve SD is closed, the oil path 54 communicates with the drain through the solenoid valve SD, whereby the first brake B1 is disengaged or released.

On the other hand, when the solenoid valve SC is made open, operating oil at line pressure is supplied to the oil path 52 to engage the third clutch K3. At this time, the fourth accumulator 40 acts to alleviate the accompanying shock. The first clutch K1 and the third clutch K3 are thus engaged to establish 3rd gear. In 3rd gear, the solenoid valve SD is controlled to be closed so that the oil pressure that acts at the left end of the pressure delivery valve 28 via the oil paths 54, 54b falls to zero. However, the spool 28a is maintained at its position to the right by the operating oil pressure supplied via the oil path 78. Consequently, in the same manner as described above for the case of 2nd gear, when the solenoid valve SE is switched to the ON state, it becomes possible to control the lockup clutch by the pressure outputted from the solenoid valve SE.

Gear shifting from 3rd to 4th will now be explained.

In this case, only the solenoid valves SB and SD are controlled to be switched to ON. The solenoid valve SB is accordingly opened and the solenoid valve SC is closed. Since the solenoid valve SA is kept open, the first clutch K1 is kept engaged. Further, when the solenoid valve SC is closed, the line pressure supplied to the third clutch K3 is cut off (which is the reverse of the state established for the case of 3rd gear), thereby disengaging or releasing the third clutch K3.

Furthermore, since the solenoid valve SB is connected to an oil path 48a which branches off from the oil path 48, operating oil at line pressure is supplied to the second clutch K2, thereby bringing the second clutch K2 into engagement, while a shock occurred at that time by the second accumulator 36 is decreased. The first clutch K1 and the second clutch K2 are engaged such that 4th gear is established. Since the spool 28a of the pressure delivery valve 28 is maintained at its position to the right by operating oil at line pressure supplied via the oil path 78 and the oil path 42a, similarly to the 2nd gear, if the solenoid valve SE is switched ON, the lockup clutch can be controlled using the pressure outputted from the solenoid valve SE.

Next, a similar description will be given for the case in which gear is shifted up from 4th to 5th.

The solenoid valve SA is, at that time, switched from its OFF state to the ON state and the solenoid valve SC is switched from its ON state to the OFF state. As a result, the solenoid valve SA is closed and the solenoid valve SC is opened. When the solenoid valve SA is closed, the line pressure supplied from the oil path 46 is cut off, thereby disengaging or releasing the first clutch K1. The oil pressure in the oil path 46a falls to zero due to the closing of the solenoid valve SA. Since there is no change with regards to maintaining the spool 24a of the pressure release valve 24 at its position to the right, no change will happen with regard to the state of communication established between the oil path 42a and the oil path 48 at the pressure release valve 24, and therefore line pressure continues to be supplied to the input port of the solenoid valve SB. At the same time, as the solenoid valve SB is maintained in the open state, the second clutch K2 is kept engaged. And, when the solenoid valve SC is made open, line pressure is supplied to the third clutch K3 via the oil path 52 as was mentioned above, and the third clutch K3 is brought into engagement while the shock is lowered by the fourth accumulator 40. The second clutch K2 and the third clutch K3 are thus engaged to establish 5th gear. The lockup clutch control can be attained in the gear similar to the manner as described above for the case of 4th gear.

Next, a description will be given for the case in which the manual valve 20 is switched to the first gear range position, i.e., "1" in FIG. 4 due to the manual operation of the selector lever 208 to the first gear range.

Specifically, the spool 20a of the manual valve 20 is moved to the right such that its position correspond to the first gear range. Once the first gear range position is selected, the oil path 12, which is supplied with line pressure, supplies such line pressure at the manual valve 20 to the oil path 42 and an oil path 80. Furthermore, when the first gear range is selected, gear is always kept in 1st, and as a result, the ON and OFF states shown in Table 2 for 1st gear are established for the electromagnetic solenoids of the solenoid valves SA to SE.

Here, operating oil at line pressure is supplied to the oil path 80 by the communication established between the oil path 12 and the oil path 80 at the manual valve 20. The oil path 80 communicates with an oil path 82 at a delivery shift valve 32, and the oil path 82 communicates with the right end of the pressure delivery valve 28. Accordingly, line pressure acts on the right end of the pressure delivery valve 28, and this causes the spool 28a of the pressure delivery valve 28 to move leftward from its D range position at the right to the position shown in the drawing, thereby establishing communication between an oil path 70a and the oil path 64. The oil path 64 is connected to the oil path 58 which is connected to the second brake B2 via the shuttle valve 60. On the other hand, when the spool 20a of the manual valve 20 is in the first gear range position, the oil path 70a communicates with the oil path 70, thereby forming a connection with the output port of the solenoid valve SE.

Accordingly, as shown by the parentheses in FIG. 2, when the solenoid valve SE is switched to the ON state, the pressure outputted therefrom engages the second brake B2, and this makes it possible to achieve the engine braking effect. Due to the engagements of the second brake B2 and the first clutch K1 (which will be described next), it becomes possible to establish 1st gear which ensures the engine braking effect.

Next, the engagement of the first clutch K1, which is one of the characteristic features of the invention, will be explained.

Briefing this, the system is configured to enable line pressure to be supplied directly to the first clutch K1 bypassing the solenoid valve SA when the spool 20a of the manual valve 20 is switched to the first gear range position, and to have an underdrive engage control valve 30 which acts to alleviate the shock that occurs at the clutch engaging.

Specifically, the oil pressure outputted from the solenoid valve SA is supplied to the back pressure chamber of the underdrive engage control valve 30 via an oil path and a check valve provided in the oil path.

More specifically, when the spool 20a of the manual valve 20 is in the first gear range position, the oil path 12 communicates with the oil path 80, and at the underdrive engage control valve 30, an oil path 80a which branches off from the oil path 80 communicates with an oil path 68a which branches off from the oil path 68. The oil path 68 communicates with the oil path 66 at the out-gear control valve 26 and reaches the manual valve 20, thereby establishing communication with the oil path 46 at the manual valve 20 to form a connection with the first clutch K1.

On the other hand, when the spool 20a of the manual valve 20 is in the first gear range position, the oil path 44 which is connected to the output port of the solenoid valve SA communicates with an oil path 86. The oil path 86 is connected to the upper back pressure chamber of the underdrive engage control valve 30, with a one-way valve (check valve) 88 being provided in the oil path 86. The oil path 86 and the oil path 68a are connected to each other via an oil path 90, and an orifice 92 is provided in the oil path 90.

With the arrangement, since the aforesaid oil path 68a communicates with the lower end of the underdrive engage control valve 30, and the position of the spool 30a of the underdrive engage control valve 30 changes in response to the oil pressure of the operating oil passing through the off path 68a, it becomes possible to adjust the flow rate of the operating oil flowing to the oil path 68a from the oil path 80. And, since operating oil outputted from the solenoid valve SA is supplied to the upper back pressure chamber of the underdrive engage control valve 30 via the oil path 86, it becomes possible to adjust the compressive preload force of a spring 30b which pushes a spool 30a down in response to the oil pressure outputted by the solenoid valve SA, thereby making it possible to adjust the pressure of the underdrive engage control valve 30.

Figure 6:
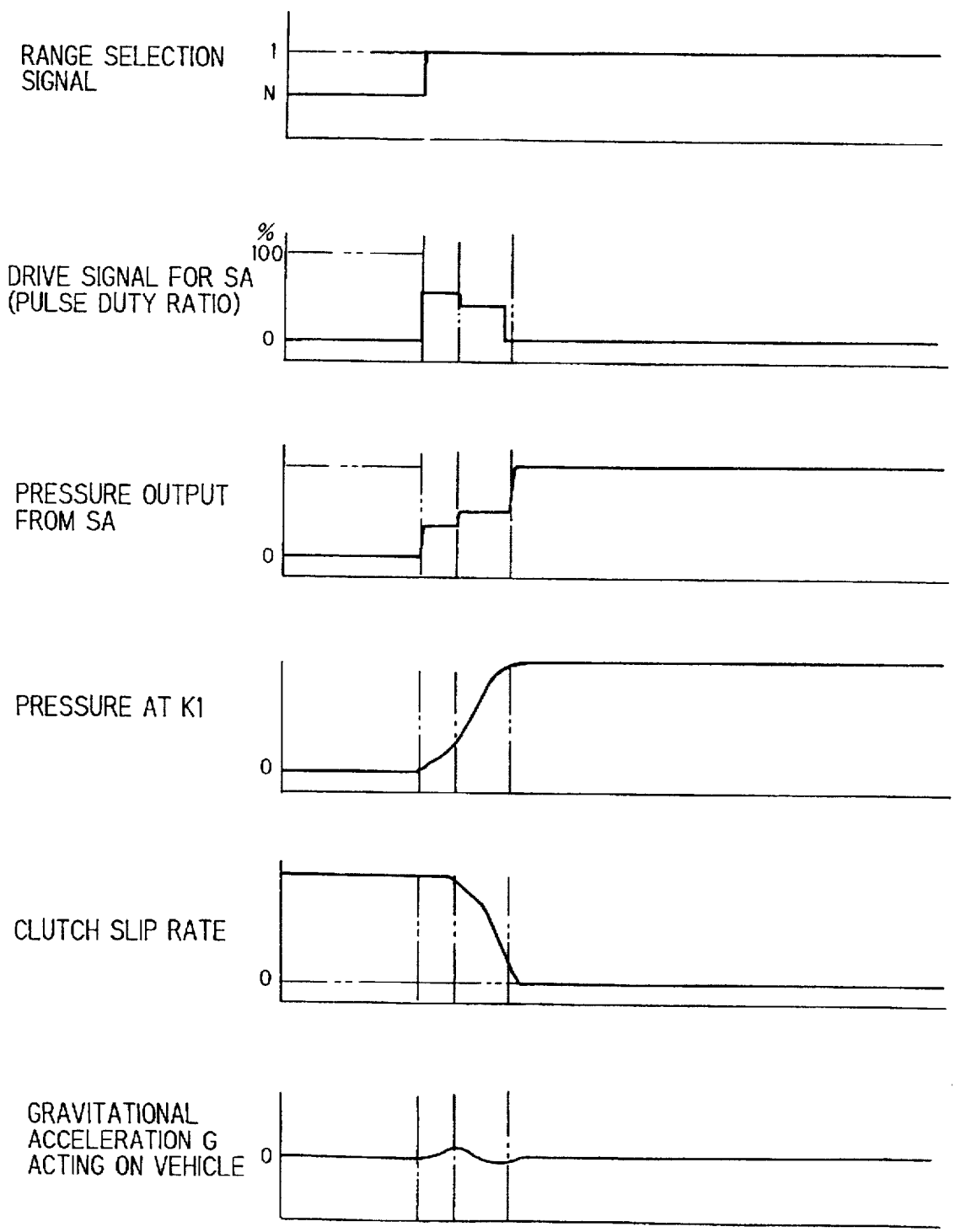
FIG. 6 is a series of simulation data graphs showing the operation of the system disclosed in FIGS. 3 and 4 when the first solenoid valve used in the circuit shown in FIGS. 2 and 5 functions properly.

Based on the above, with reference to FIG. 6, the engagement of the first clutch K1 in the system according to the invention will be explained. FIG. 6 is a series of simulation data graphs showing the operation of the system when the first solenoid valve used functions properly.

As shown by the top graph of FIG. 6 rifled "RANGE SELECTION SIGNAL", when the gear range is switched from the N range to the first range, by controlling the duty ratio (ON time) in a pulse train of the electric current to be supplied to the electromagnetic solenoid of the solenoid valve SA in the manner shown by the next graph of FIG. 6 rifled "DRIVE SIGNAL FOR SA", the pressure outputted by the solenoid valve SA and to be acted as the back pressure of the underdrive engage control valve 30 can be controlled as shown in the third graph named "PRESSURE OUTPUT FROM SA", thereby making it possible to adjust the pressure to be supplied to the first clutch K1 with respect to time. The fourth graph in the figure called "PRESSURE AT CLUTCH K1" indicates this. As shown in the fifth graph indicated as "GRAVITATIONAL ACCELERATION ACTING ON VEHICLE", the gravitational acceleration experienced by the vehicle (and the driver) due to the shock created at the time of clutch K1 engagement can accordingly be suppressed to a low value.

The 5th graph named "CLUTCH SLIP RATE" in the figure illustrates the rate of the transmission output shaft speed with respect to the transmission input shaft speed (torque converter turbine speed). The fact that the slip ratio becomes zero indicates that the slip between the shafts decreases to zero such that the frictional engaging element concerned has been completely engaged, in other words the gear shifting has completed. The time required for this to take place is often called as the "in-gear time". The system according to the invention can control the in-gear time by adjusting the timing of pressure supply to the first clutch K1, thereby ensuring no engine rev occurs if, for example, the accelerator pedal is depressed when the gear range has been shifted to the first position.

The above description was based on the assumption that the solenoid valve SA functioned normally (i.e., in a non-failure situation) at the time of the first gear range position. However, there may be a case in which an electric malfunction such as a poor electrical flow or a mechanical malfunction occurs in the solenoid valve SA, which may render the solenoid valve SA to stick in a closed state. If such a closed-stick failure happens, it becomes impossible to bring the first clutch K1 into engagement at the D range position. Consequently, it is not possible to establish the first to fourth gears, i.e., only fifth gear can be established in the D range, and this results in an extremely low vehicle running performance.

In order to avoid such problems in the system according to the invention, when the solenoid valve SA malfunctions in a way that causes it to be stuck in a closed position, it is configured such that if the selector lever is operated to switch the manual valve 20 from the D range position to the first range position, operating oil to the first clutch K1 can be supplied without having to pass through the solenoid valve SA, thus making it possible to establish 1st gear.

Next, with reference to FIG. 7, a description will be given for the case in which the first gear range is selected to bring the first clutch K1 into engagement when the solenoid valve SA malfunctions and remains stuck (closed).

Figure 7:
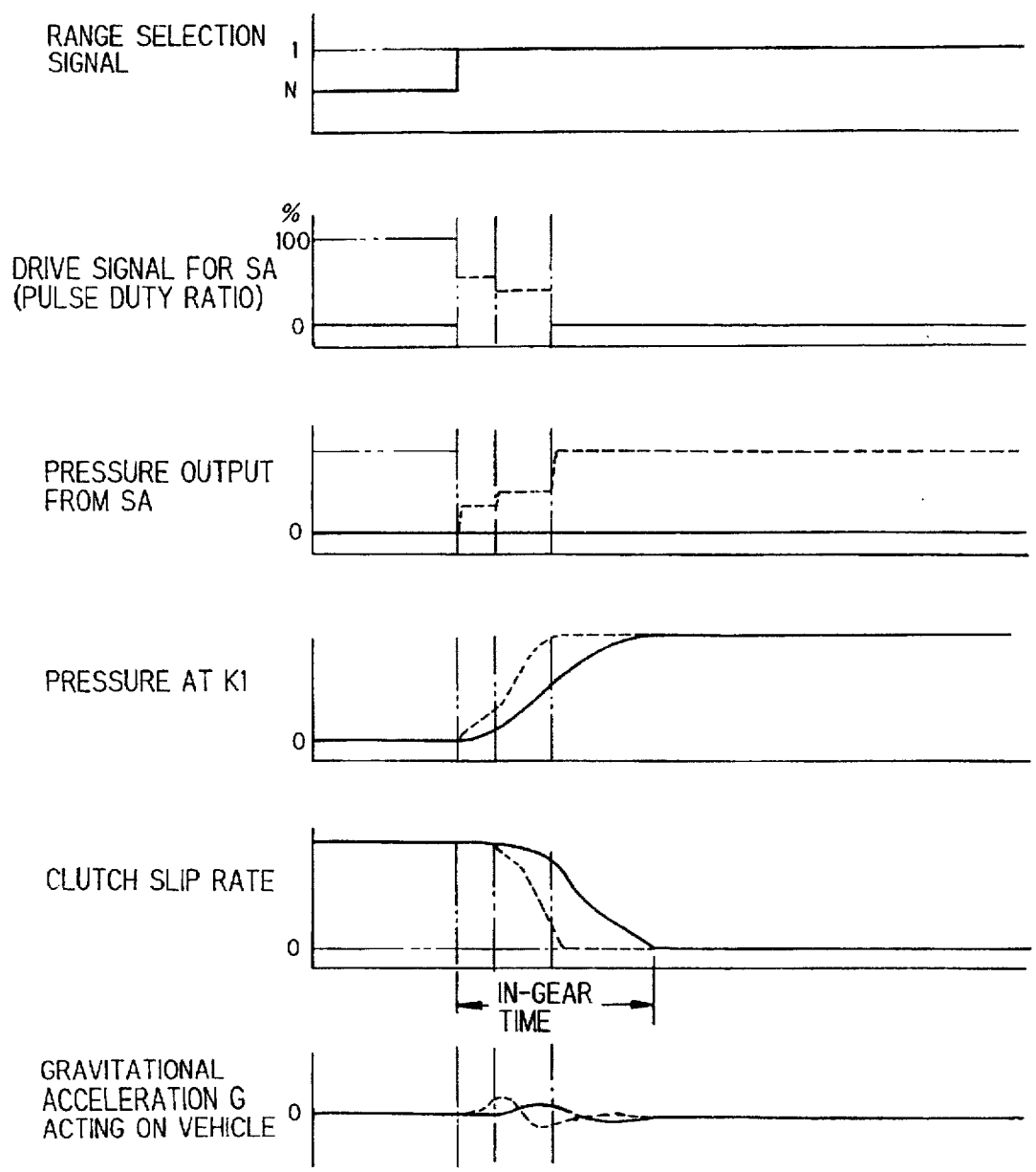
FIG. 7 is a series of graphs, similar to FIG. 6, but showing the operation of the system when the solenoid valve malfunctions and sticks to stay closed.

FIG. 7 is a view similar to FIG. 6. When the gear range is switched from the N range to the first range as shown in the top graph ("RANGE SELECTION SIGNAL"), line pressure is supplied directly to the first clutch K1 via the manual valve 20 bypassing the malfunctioning solenoid valve SA. Since operating oil is supplied to the oil path 86 via the orifice 92, there is a small delay in the supply of operating oil to the first clutch K1, as shown by the solid line in the fourth graph ("PRESSURE AT K1"). Although this results in a long in-gear time as shown by the solid line in the fifth graph ("CLUTCH SLIP RATE"), it is possible to bring the first clutch K1 into engagement, and this ensures preventing the marked lowering of the running performance of the vehicle.

Moreover, as mentioned above, since the system is configured such that the one-way valve (check valve) 88 is provided in the oil path 86, even when the solenoid valve SA sticks to stay closed (i.e., malfunctions in a manner that causes it to stay closed), the oil path 44 which is connected to the output port of the solenoid valve SA is prevented from opening to the drain and the oil pressure which is supplied to the first clutch K1 via the oil paths 86, 90 and 68a (which are connected to the oil path 44) is prevented from being drained, thereby ensuring the establishment of 1st gear even when failure occurs in the solenoid valve SA.

Thus, the system makes it possible to cope with the situation in which the solenoid valve SA malfunctions. Furthermore, the system makes it possible to reduce the in-gear shock during normal operations (i.e., when no malfunction occurs in the solenoid valve SA) by controlling the supply timing of the pressure to the first clutch K1 when the selector lever is operated to select the first gear range.

Here, a brief description will be given for the case in which a malfunction occurs in the underdrive engage control valve 30 in the system at the time the first gear range is selected.

First, in the case where the underdrive engage control valve 30 malfunctions in a manner that causes it to stay open (stuck to open), since the oil path 80a and the oil path 68a become communicating with each other, line pressure from the oil path 12 will then be supplied to the first clutch K1 to bring it into engagement, as described above, thereby establishing 1st gear. Since it is not possible to expect the underdrive engage control valve 30 to perform to adjust pressure, the resulting gear shifting shock becomes large, but it is possible to ensure the establishment of 1st gear.

Moreover, when the underdrive engage control valve 30 malfunctions to stick to stay closed, the oil path 80a and the oil path 68a will lose communication with each other, and this makes it impossible to supply line pressure from the oil path 12 to the first clutch K1. However, the pressure outputted by the solenoid valve SA will then be supplied to the oil path 86 via the oil path 44 when the spool 20a of the manual valve 20 is in the first gear range position. Since the oil path 86 communicates with the oil path 68 via the orifice 92, the pressure outputted by the solenoid valve SA can be supplied to the first clutch K1. Furthermore, since the orifice 92 acts to slow down the rise in pressure of the supplied oil, the in-gear shock can be reduced. However, this may result in a long in-gear time under low oil temperature conditions.

As mentioned above, even in the case where the underdrive engage control valve 30 provided malfunctions, the first clutch K1 can be brought into engagement when the first gear range position is selected, thereby establishing 1st gear.

Figure 8:
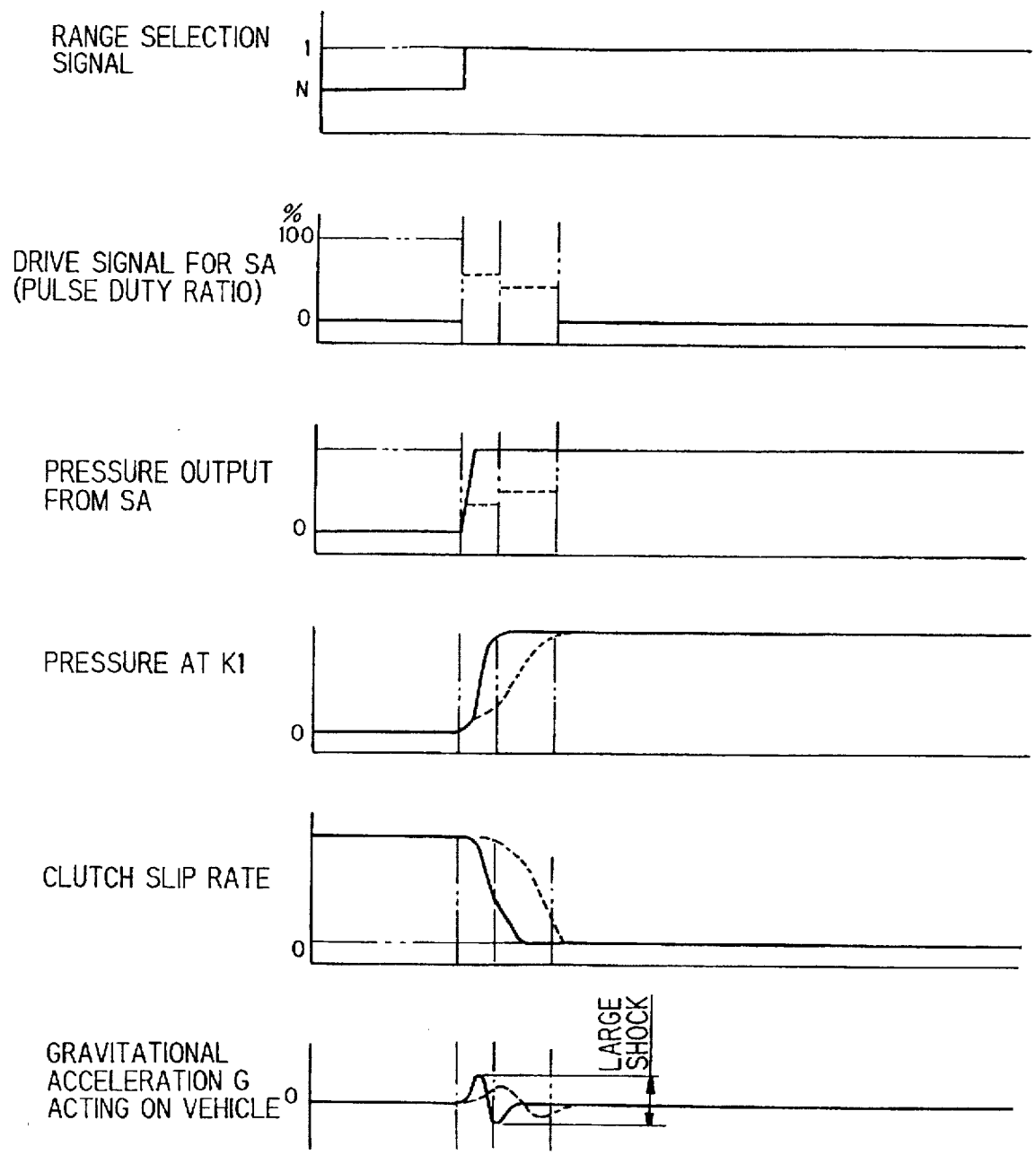
FIG. 8 is a series of simulation data graphs, similar to FIG. 6, but showing the operation when the solenoid valve malfunctions and sticks to stay open.

Incidentally, when the solenoid valve SA malfunctions by sticking to stay open (remains in an opening state), it is still possible to establish the first to fourth gears in the D gear range. However, since it is unable to regulate the pressure outputted by the solenoid valve SA when it sticks to stay open, sudden rises may occur in the oil pressure supplied to the first clutch K1, and this may create large shocks at the time of changing the gear range from N to D or 1. FIG. 8 is a view similar to FIGS. 4 and 5 and illustrates by solid lines such a situation in which the gear range is switched from N to 1.

Figure 9:
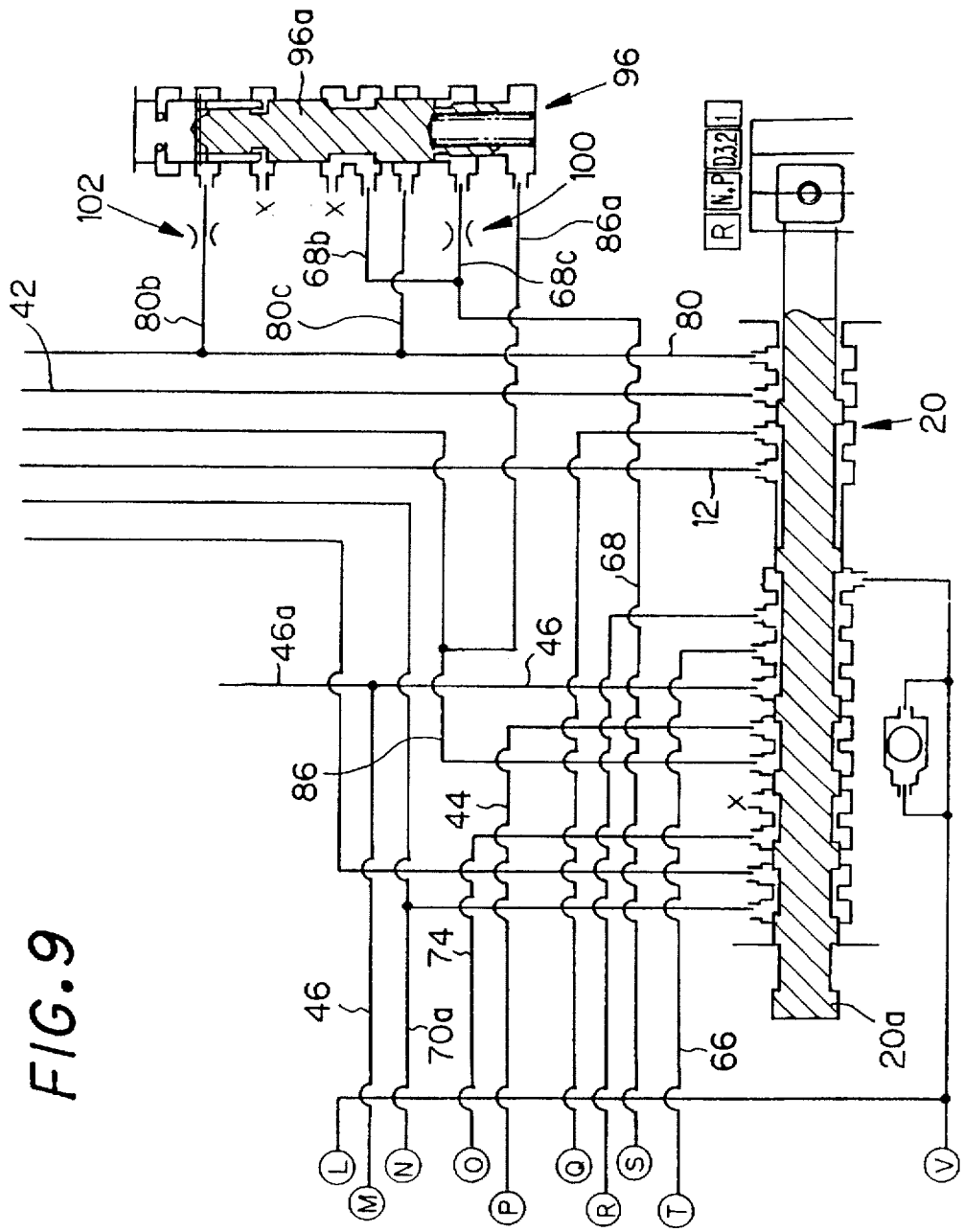
FIG. 9 is a view, similar to FIGS. 5 and 6, but showing a portion of a circuit used in an oil pressure control system for the automatic vehicle transmission according to a second embodiment of the invention.

FIG. 9 is a partial view of an oil pressure control circuit of an oil pressure control system for an automatic vehicle transmission according to a second embodiment of the present invention.

Except for the portion of the oil pressure circuit shown there, the structure of the second embodiment is the same as that of the first embodiment shown in FIGS. 3 and 4. For this reason, the following description will focus on the structure shown in FIG. 9.

The system according to the second embodiment will be explained again taking as example the case that the gear range is switched to the first gear range.

Once the first gear position is selected, a connection is formed between the oil path 12, which is supplied with line pressure, and both the oil path 42 and the oil path 80. In order to supply line pressure directly bypassing the solenoid valve SA, the system according to the second embodiment is similarly provided with the aforesaid underdrive control valve 96 for ensuring the pressure supply to the first clutch K1 and for reducing the shock at clutch engagement. That is, the system according to the second embodiment also deals with the problems encountered in the prior art system shown in FIGS. 19 and 20 when the solenoid valve SA does not function properly in the first gear range. Specifically, when the spool 20a of the manual valve 20 is shifted to the first gear range position, the pressure outputted by the solenoid valve SA is guided to the lower end portion of the underdrive control valve 96 via the oil paths 44, 86 and 86a, thereby making it possible to regulate the pressure to be supplied to the first clutch K1 in response to the pressure outputted from the solenoid valve SA.

More specifically, when the spool 20a of the manual valve 20 is in the first gear range position, the oil path 12 communicates with the oil path 80, thereby supplying operating oil at line pressure to the upper end portion of the underdrive control valve 96 via the oil paths 80 and an oil path 80b, and this causes a spool 96a of the underdrive control valve 96 to be pushed downward. With the arrangement, an oil path 80c communicates with the oil path 68b, and with an oil path 68c which branches off from the oil path 68b being connected to the lower end portion of the underdrive control valve 96, whereby an upward force is applied to the spool 96a. However, due to the difference in the surface area on which the pressure acts, the downward force acting on the spool 96a due to the operating oil pressure supplied from the oil path 80b is larger than the upward force.

Further, the oil path 68 which communicates with the oil paths 68b and an oil path 68c communicates with the oil path 66 at the underdrive control valve 26 to form a path that returns to the manual valve 20 so as to communicate with the oil path 44, thereby forming a connection with the first clutch K1. On the other hand, the oil path 86awhich is connected to the lower end portion of the underdrive control valve 96 communicates with the oil path 44 at the manual valve 20 via the oil path 86, with the oil path 44 being connected to the output port of the solenoid valve SA.

The out-gear control valve 26 controls the release of oil pressure from the first clutch K1 via an oil path 98 by releasing oil pressure at the third clutch K3 when the manual valve 20 is switched from the R range position to the N range position. Thus, the out-gear control valve 26 prevents shocks from occurring during the out-gear time (i.e., the time for switching from the R position to the N range position, or from the D range position to the N range position).

Figure 10:
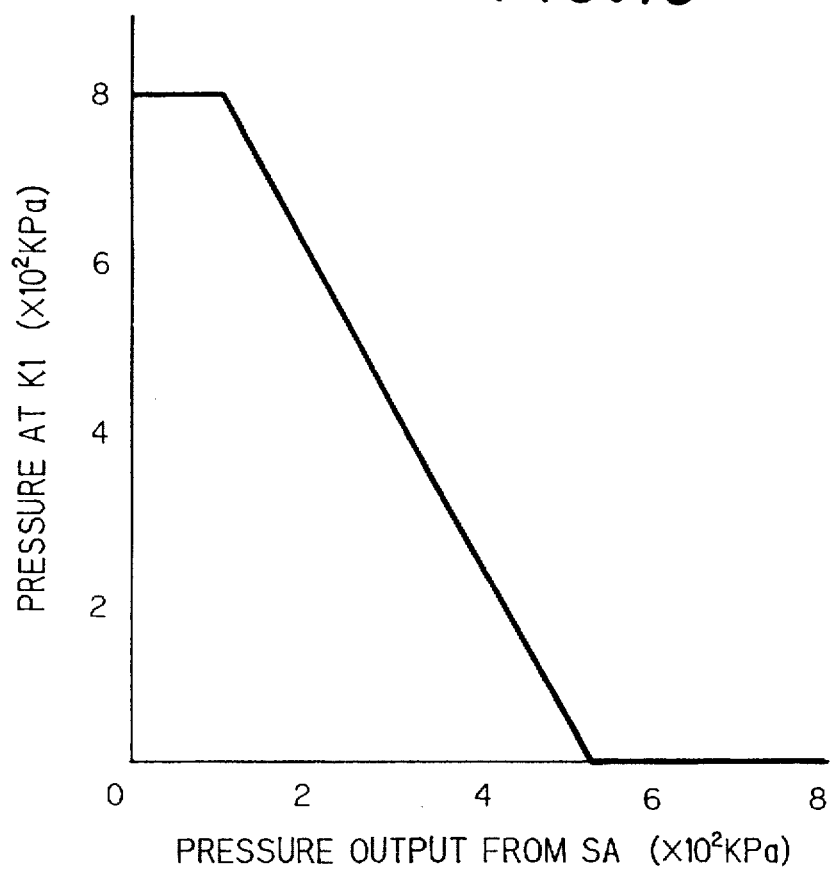
FIG. 10 is a graph showing the pressure adjusting characteristics of an underdrive control valve shown in FIG. 9.

Having been configured in the foregoing manner, since orifices 100 and 102 are provided in the oil paths 68c and 80b, the rise in oil pressure that occurs can be moderated when the manual valve 20 is in the first gear range position. Further, since the oil pressure outputted by the solenoid valve SA is supplied to the lower end portion of the underdrive control valve 96 via the oil paths 44, 86 and 86a, when the oil pressure outputted by the solenoid valve SA rises to cause the spool 96a to move upward to a different position, thereby preventing the communication between the oil path 80 and the oil path 68b to lower the operating oil pressure supplied to the first clutch K1. This means that, the pressure adjusting characteristics of the underdrive control valve 96 can be set so as to establish an inverse proportional relationship, as shown in FIG. 10, between the oil pressure outputted by the solenoid valve SA and the oil pressure supplied to the first clutch K1.

Based on the above, the operation of the system according to the second embodiment will be explained with reference to FIG. 11 focusing on the engagement of the first clutch K1 when the underdrive control valve 96 functions normally at the first gear range position.

Figure 11:
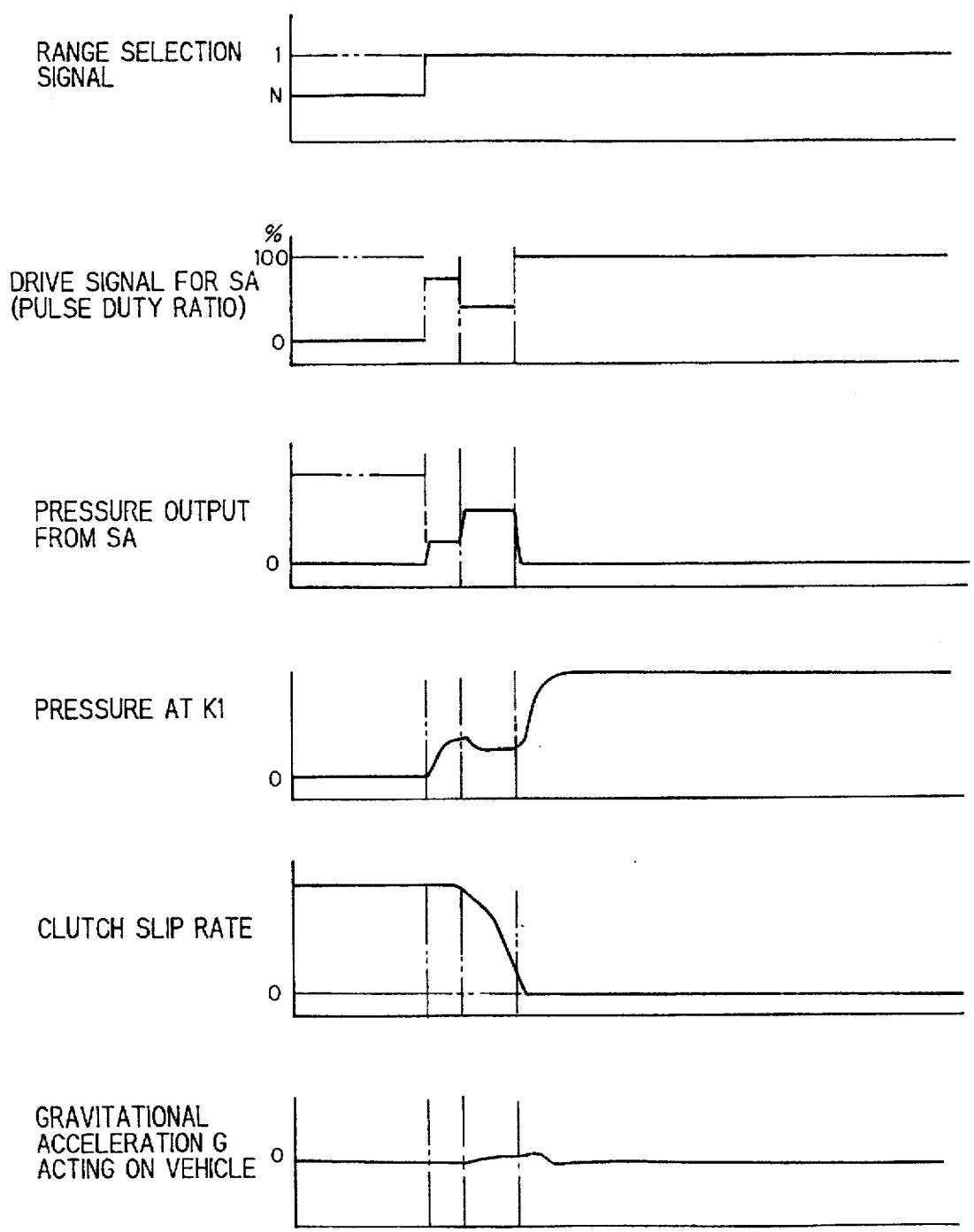
FIG. 11 is a series of simulation data graphs, similar to FIG. 6, but showing the operation of the system according to a second embodiment of the invention when the solenoid valve functions properly.

FIG. 11 is a view similar to FIG. 6. As disclosed, when the first gear range position is selected ("RANGE SELECTION SIGNAL"), by controlling the duty ratio (pulse-on time in PWM) of the electric current to be supplied to the electromagnetic solenoid of the solenoid valve SA (as shown as "DRIVE SIGNAL FOR SA"), the oil pressure that is outputted by the solenoid valve SA is controlled and acts as the back pressure of the underdrive control valve 96 (as shown as "PRESSURE OUTPUT FROM SA"), and the oil pressure supplied to the first clutch K1 can be controlled as desired (as shown as "PRESSURE K1 "). With this arrangement, it becomes possible to reduce the in-gear time and to prevent engine revving even when the accelerator pedal is depressed after the gear range has been switched from the N gear range position to the first gear range position, thereby keeping the in-gear shock at a suitably low level.

Furthermore, in the same manner as described above for the first embodiment, when the solenoid valve SA malfunctions, by operating the selector lever such that the manual valve 20 is switched to the first gear range position, line pressure can be supplied directly to the first clutch K1 via the manual valve 20 without having to pass through the malfunctioning solenoid valve SA, thereby making it possible to bring the first clutch K1 into engagement. In this way, it becomes possible to operate the vehicle in 1st gear even in the case where the solenoid valve SA gets troubled.

A description of this situation will now be given with reference to FIGS. 12 and 13.

Figure 12:
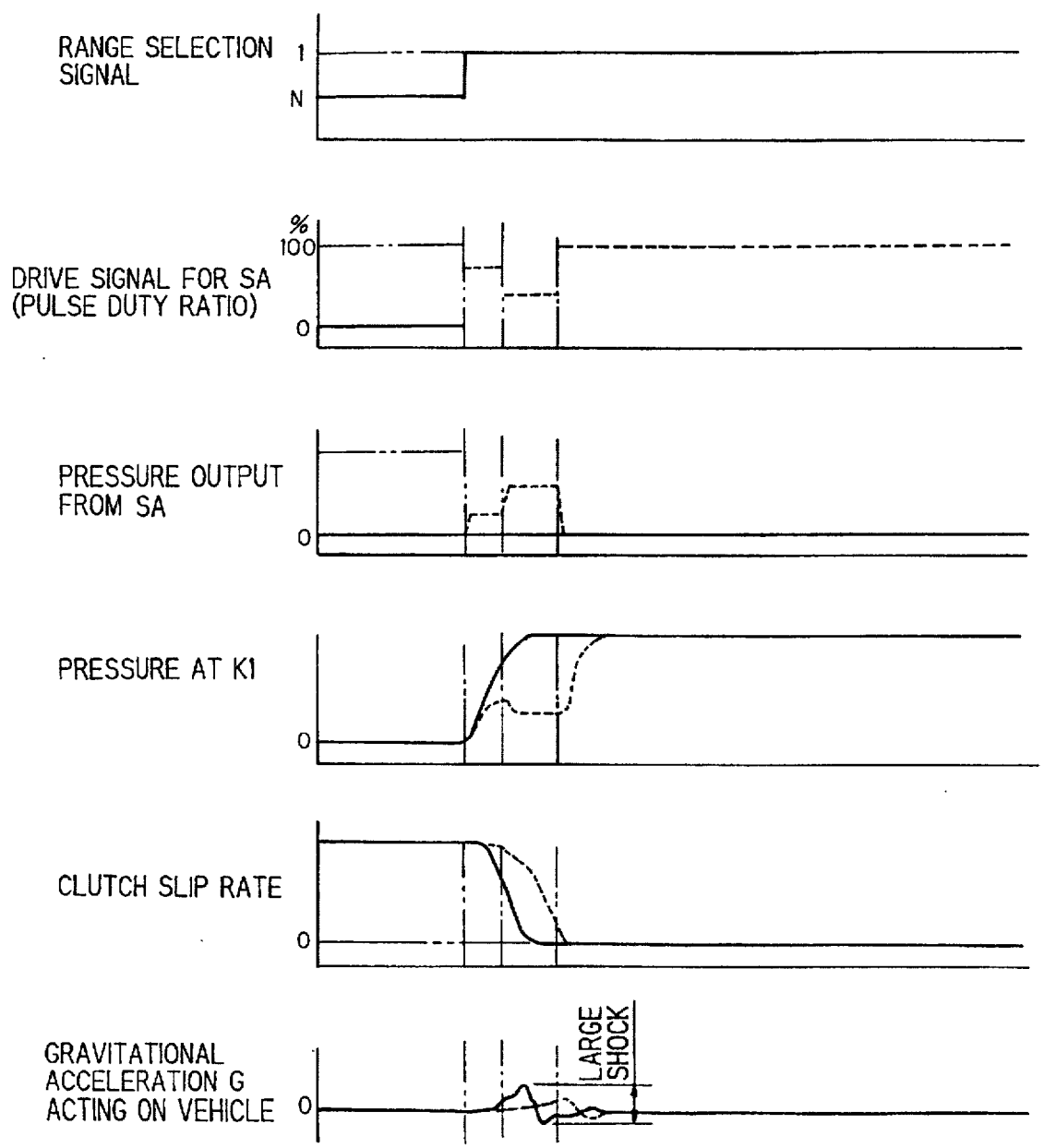
FIG. 12 is a series of simulation data graphs, similar to FIG. 11, but showing the operation of the system when the solenoid valve malfunctions and sticks to stay closed.
Figure 13:
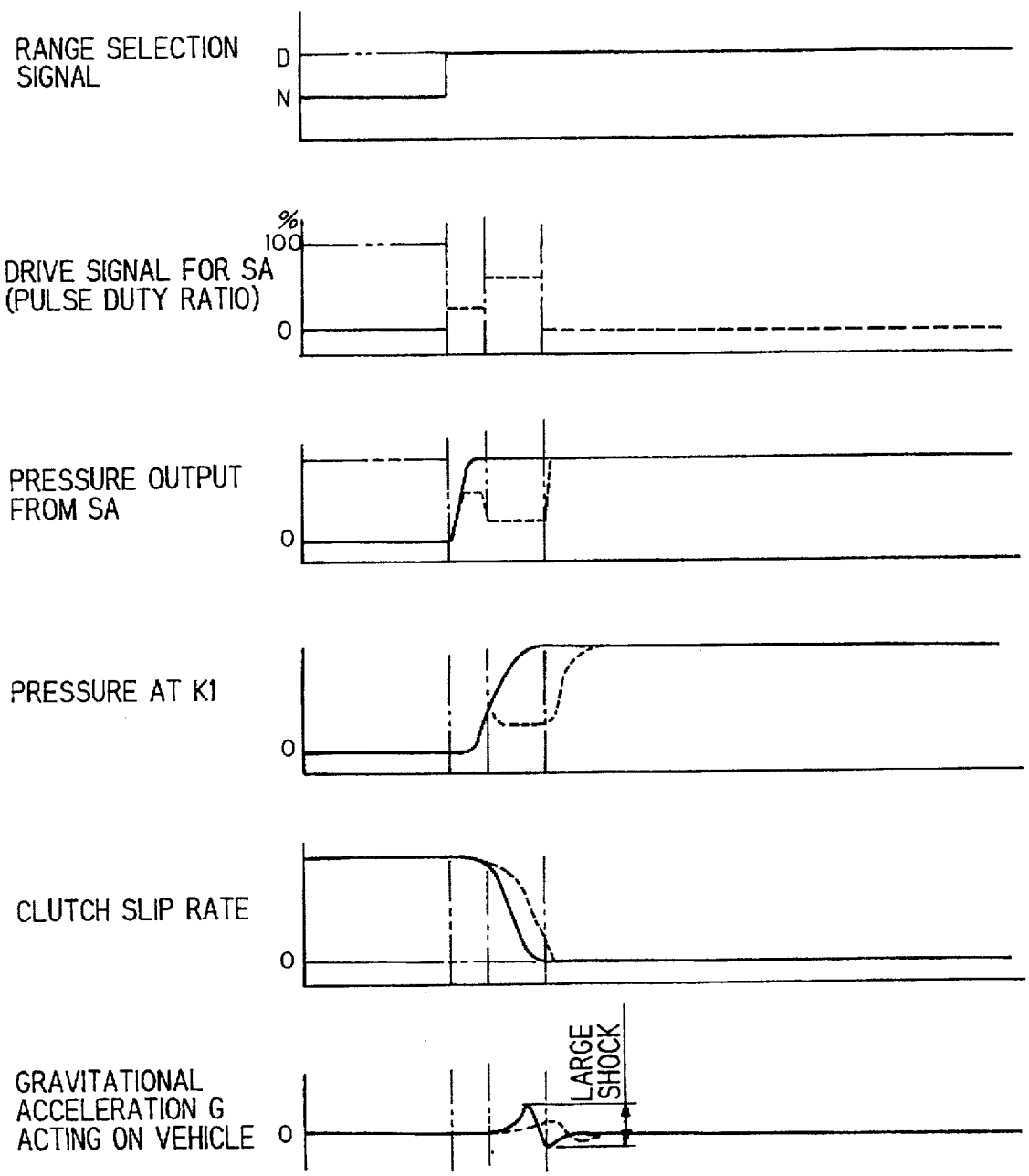
FIG. 13 is a series of simulation data graphs, similar to FIG. 12, but showing the operation of the system when the solenoid valve malfunctions and sticks to open.

FIGS. 12 and 13, which are similar to FIG. 6, illustrate the case in which the gear range is switched from N to 1 to operate the vehicle in 1st gear when the solenoid valve SA sticks to stay closed.

In this situation, since the oil pressure to the first clutch K1 is completely supplied by the solenoid valve SA when the manual valve 20 is in the D range, no gear can be established. However, by switching the selector lever to the first range as shown in FIG. 12 as "RANGE SELECTION SIGNAL", line pressure is supplied directly to the first clutch K1 bypassing the solenoid valve SA as shown by the solid line in the figure, making it possible to operate the vehicle in 1st gear. Since the pressure adjustment of the underdrive control valve 96 by the solenoid valve SA is not carried out, a large gear shifting shock may occur (as shown by the graph of FIG. 12 rifled "GRAVITATIONAL ACCELERATION ACTING ON VEHICLE"). When the solenoid valve SA sticks to stay open, on the other hand, switching range to 1 makes it impossible to regulate the pressure outputted from the solenoid valve SA, and this causes the pressure outputted from the solenoid valve SA to act on the lower end portion of the underdrive control valve 96 all the time. As a result, the spool 96a can not be moved to a lower position and communication can not be established between the oil path 80c and the oil path 68b, and therefore it is not possible to supply operating off pressure to the first clutch K1.

However, even in this case, it is possible to establish 1st gear if switched to the D range as shown in FIG. 13 as "RANGE SELECTION SIGNAL", this enables operating oil to be supplied to the first clutch K1 without having to pass through the underdrive control valve 96 as shown by the solid line in the figure, ensuring the vehicle to run in 1st gear, although there occurs a large in-gear shock (as shown by the graph of FIG. 13 rifled "GRAVITATIONAL ACCELERATION ACTING ON VEHICLE") due to the inability to adjust the pressure outputted from the solenoid valve SA.

In the system according to the second embodiment described above, by providing the underdrive control valve 96, it is thus possible to control the oil pressure supplied to the first clutch K1 as desired by regulating the oil pressure normally outputted from the solenoid valve SA, which in turn makes it possible to keep the in-gear shock at a suitably low level. Furthermore, it is possible to establish 1st gear even when a malfunction occurs, thus making it possible to ensure a prescribed running performance for the vehicle.

Further, since the relationship between the oil pressure outputted from the solenoid valve SA and the oil pressure supplied to the first clutch K1 becomes an inverse proportional relationship like the one shown in FIG. 10, even if the solenoid valve SA malfunctions in a manner that cause it to stay open or closed, i.e. sticks to stay open or closed, it is still possible to operate the vehicle in any gear except the highest gear if the gear range is switched to the D range or the first range, as shown in FIG. 14. It should be noted here that, when the solenoid valve SA sticks to stay closed as shown by the bottom portion of FIG. 14, gears change will be made in a particular manner to be conducted at failure that are different from those illustrated in FIGS. 2 and 5.

Figure 15:
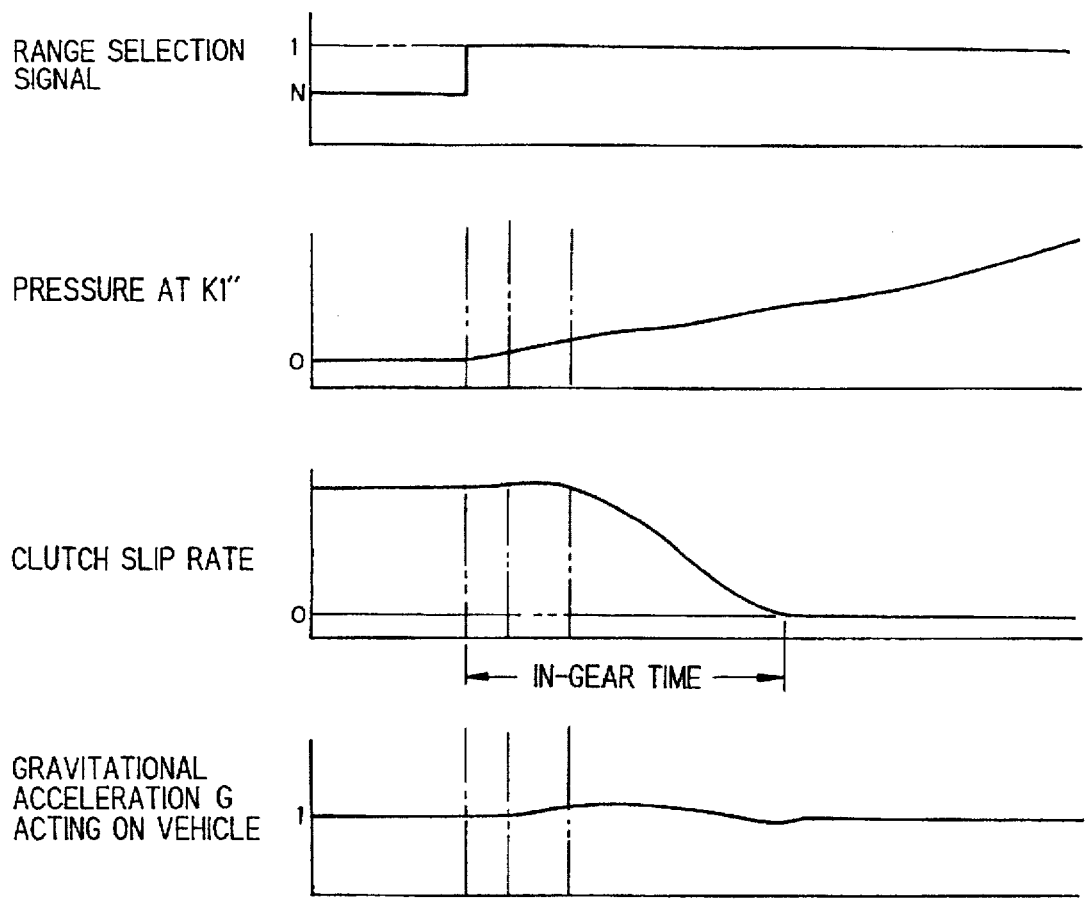
FIG. 15 is a series of simulation dam graphs, similar to FIG. 6, but showing the operation of a prior art system under low oil temperature.
Figure 16:
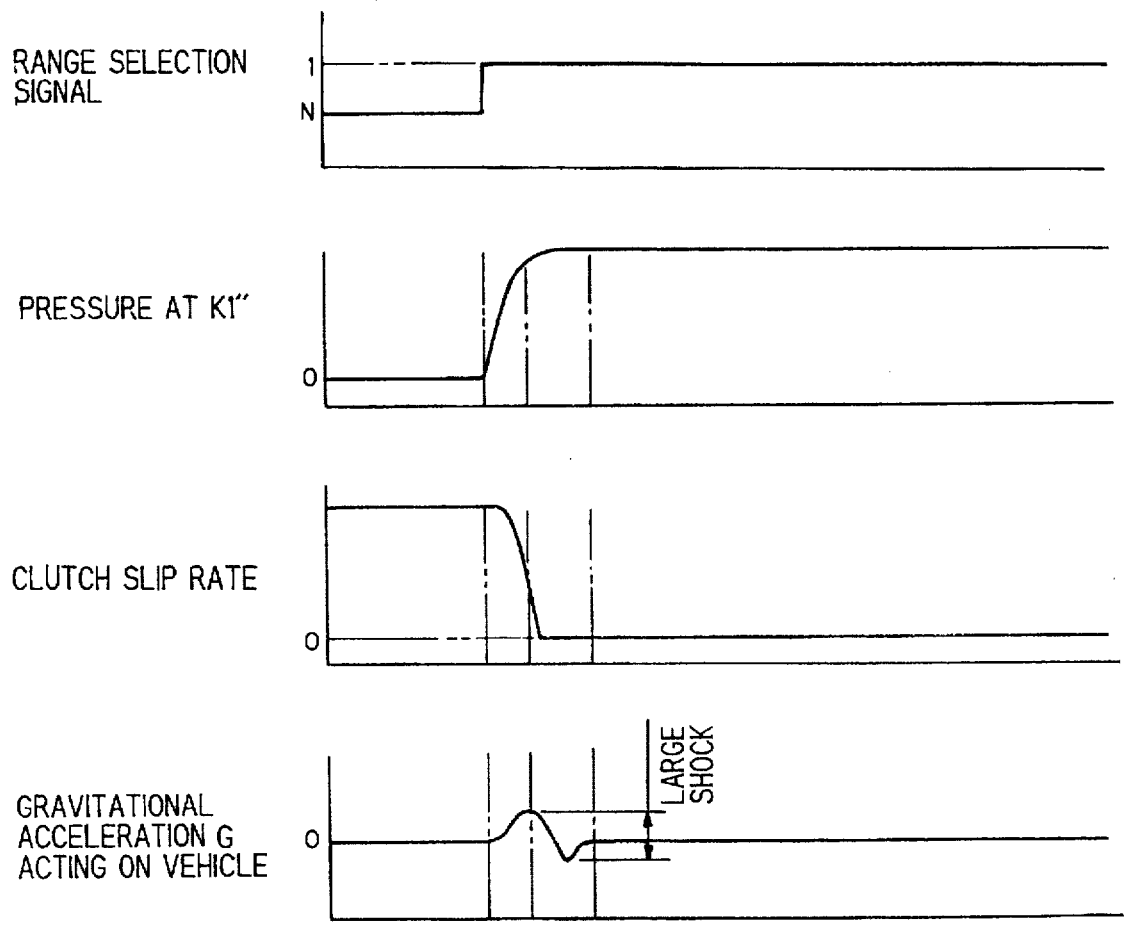
FIG. 16 is a series of simulation data graphs, similar to FIG. 15, but showing the operation of the prior art system under normal oil temperature.
Figure 17:
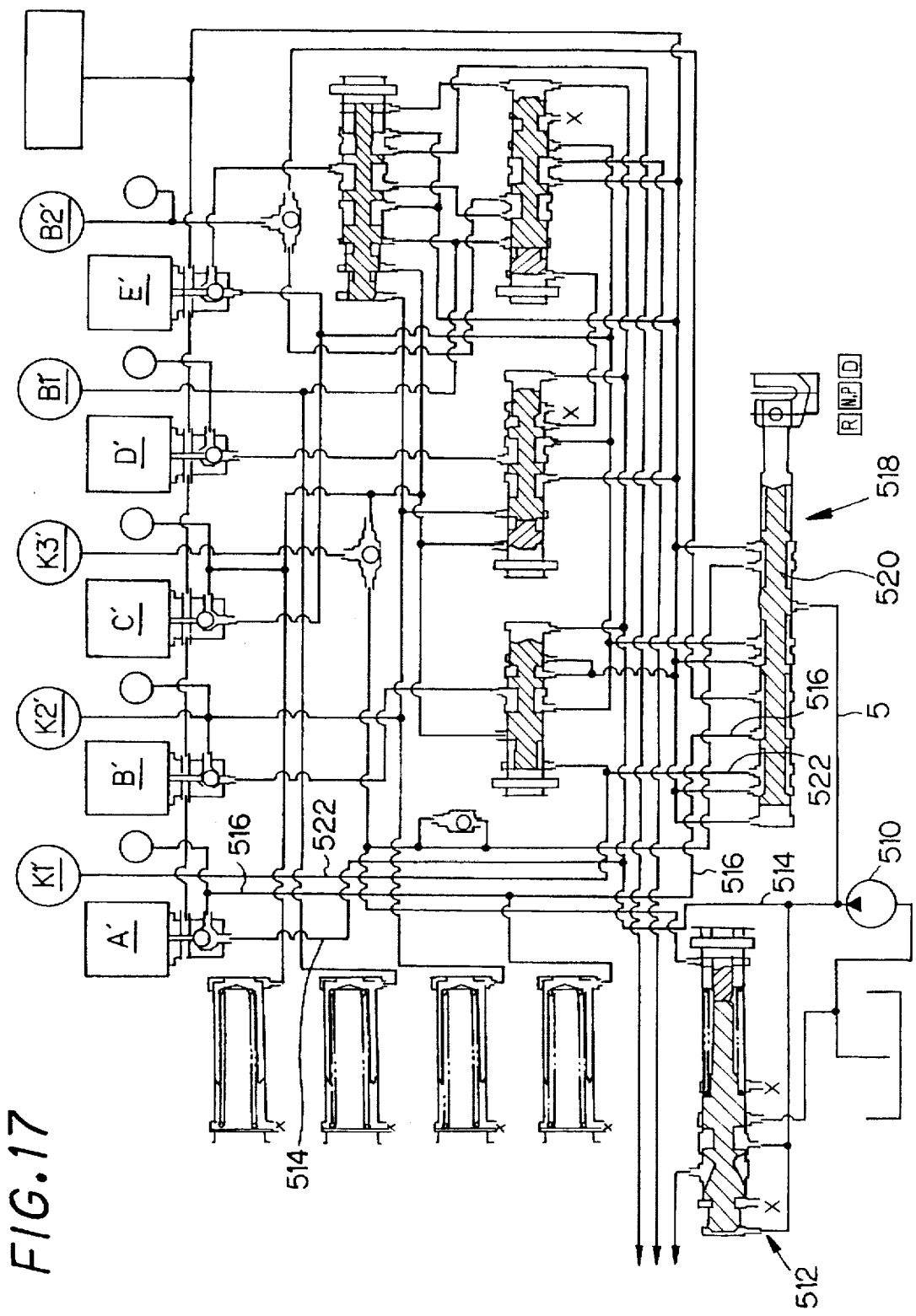
FIG. 17 is a detailed circuit diagram showing a portion of the prior art oil pressure control system of an automatic vehicle transmission.
Figure 19:
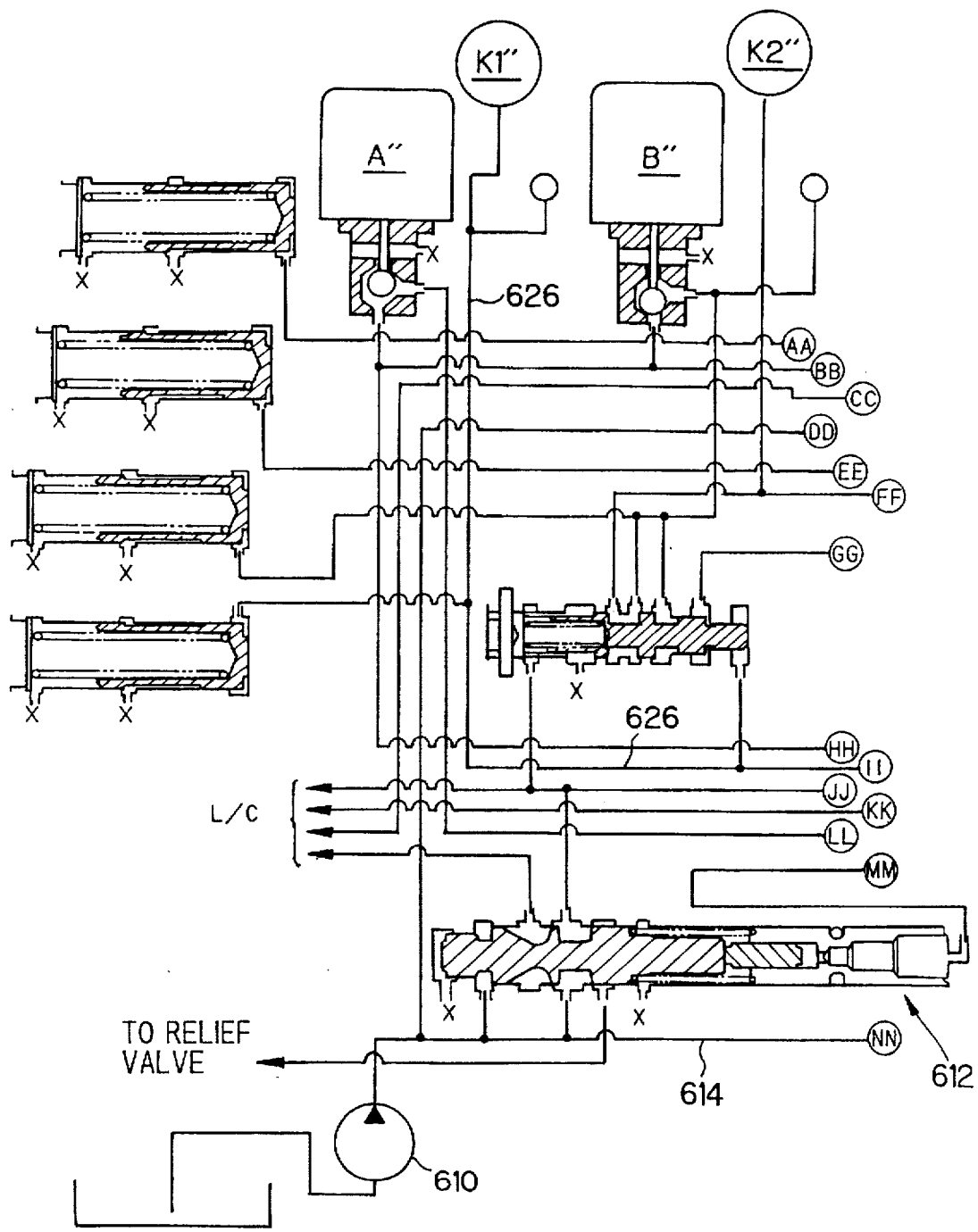
FIG. 19 is a view, similar to FIG. 17, but showing a first half of a circuit of another prior art oil pressure control system of an automatic vehicle transmission.
Figure 20:
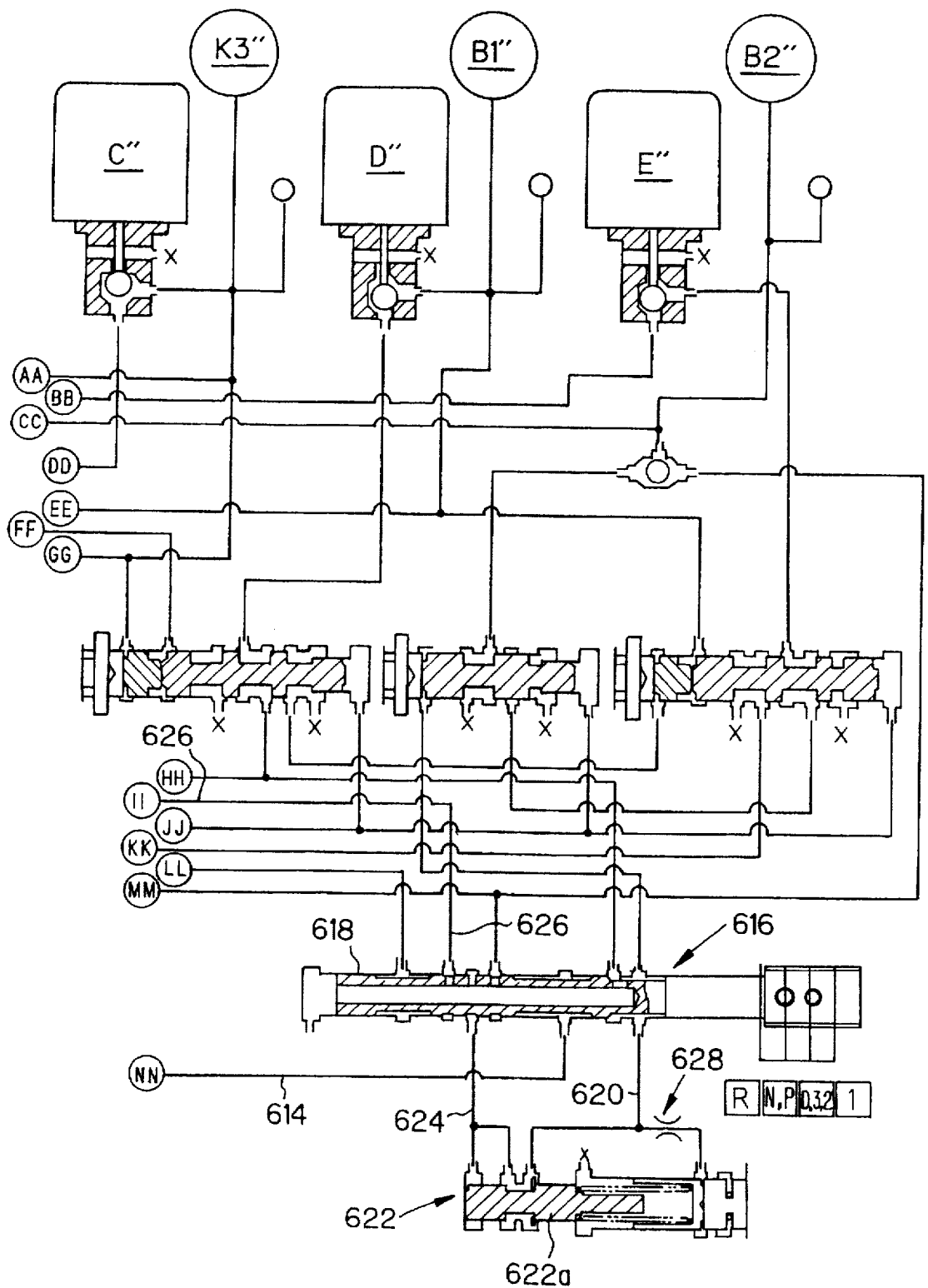
FIG. 20 is a view, similar to FIG. 19, but showing a second half of the circuit of the prior art oil pressure control system.

Here, in order to compare the operation achieved by the oil pressure control systems according to the above-described first and second embodiments of the present invention with the prior art system shown in FIGS. 19 and 20, the operation of the prior art system will be illustrated with respect to the clutch K1 engagement at gear range switching from N to 1 in FIGS. 15 and 16.

First, FIG. 15 shows the situation in which the operating oil is at a low temperature. In this case, when shifting is carried out to switch from the N range to the first range in the manner shown by the graph of FIG. 15 titled "RANGE SELECTION SIGNAL", the pressure of the operating oil supplied to the first clutch K1" does not rise easily as shown by the graph rifled "PRESSURE AT K1 ", and this causes the in-gear time to become rather large as shown by the graph named "CLUTCH SLIP RATE". Namely, it becomes difficult to supply operating oil immediately to the back pressure chamber of an underdrive engage control valve 622 to move a spool 622a to the left due to the flow path resistance of an orifice 628 in the prior art system of FIGS. 19 and 20 being too great when the oil temperature is low, thereby regulating the operating oil supplied to the first clutch K1" to rise.

On the contrary, in the oil pressure control system according to the first or second embodiments of the present invention, as described above with reference to FIGS. 6 and 11, the use of the solenoid valve SA in the first embodiment to control the supply timing of the operating oil pressure to the first clutch K1, or by controlling the operating oil pressure supplied to the first clutch K1 in the second embodiment, it is possible to shorten the in-gear time even in the case where the operating oil is at a low temperature.

FIG. 16 shows the case in which the operating oil is at a normal temperature. In this case, when the gear range is switched from N to 1 as illustrated in the graph of FIG. 16 rifled "RANGE SELECTION SIGNAL", the pressure of the operating oil supplied to the first clutch K1" rises suddenly as shown by the graph rifled "PRESSURE AT K1"", and this results in a short in-gear time, as shown by the graph titled "CLUTCH SLIP RATE", accompanied by a large shock as shown by the graph rifled "GRAVITATIONAL ACCELERATION ACTING ON VEHICLE". The reason why such a large shock occurs in the prior art system of FIGS. 19 and 20 is that the oil pressure supplied to the first clutch K1" at the first gear range can be moderated only by the flow path resistance of the orifice 628, thereby making it impossible to adjust the oil pressure supplied to the first clutch K1" to a desired value.

On the other hand, in the oil pressure control system according to the first embodiment of the present invention, as described above with reference to FIG. 8, by using the solenoid valve SA to control the supply timing of the operating oil pressure to the first clutch K1, it is possible to reduce the in-gear shock. Further, in the oil pressure control system according to the second embodiment, as described above with reference to FIG. 11, by controlling the operating oil pressure supplied to the first clutch K1, the in-gear shock can be reduced at a normal operating oil temperature.

Having been configured in the foregoing manner, the embodiments provides a system for controlling oil pressure of an automatic transmission mounted on a vehicle, including a selector lever (208) for selecting one among a plurality of gear ranges in the transmission; a plurality of frictional engaging elements (K1,K2,K3,B1,B2) installed in the transmission for establishing a gear in a gear train in the selected gear range; an oil pump (10) for pumping oil from an oil reservoir to generate pressurized oil; a plurality of solenoid valves (Sa to SE) at least one (SA) of which opens to supply the pressurized oil to at least one (K1) of the frictional engaging elements; a switching valve (manual valve 20) whose spool moves in response to the selection of the selector lever for supplying the pressurized oil to the frictional engaging element (K1) outputted from the solenoid valve (SA) when the selector lever selects one gear range (D), while supplying the pressurized oil to the frictional engaging element bypassing the solenoid valve when the selector lever selects another gear range (1); and a regulating valve (underdrive engage control valve 30, 96) placed between the frictional engaging element and the switching valve for regulating the pressure of the pressurized oil to be supplied to the frictional engaging element in response to the pressurized oil outputted from the solenoid valves. The characteristic feature is that the regulating valve regulates the pressure of the pressurized oil to be supplied to the frictional engaging element in response to the pressurized oil supplied from the switching valve.

With the arrangement, it becomes possible to provide an oil pressure control system for an automatic vehicle transmission which can more appropriately or precisely control the supply of oil pressure to frictional engaging elements using a valve for regulating the supply of oil pressure to one or all of the frictional engaging elements and, when a malfunction should occur in the valve for regulating the supply of operating oil pressure to the frictional engaging element, can directly supply operating oil pressure to such frictional engaging element without having to pass through or bypassing the malfunctioning valve such that at least a gear is established to keep the vehicle running. On the other hand, when the solenoid valve functions normally, the oil pressure can be supplied to the frictional engaging element such that it rises quickly even under low oil temperature. Just after the manual valve has been switched to supply the oil to the frictional engaging element under normal oil temperature and the transmission input shaft speed is suddenly raised, it can be decreased to a moderate level in a short time.

In another aspect, there is provided a system wherein the pressurized oil supplied by the switching valve communicates with the pressurized oil outputted from the fictional engaging element through an orifice (92). With this arrangement, it becomes possible to supply oil to the frictional engaging element by controlling the timing of supply under normal operation, while it becomes possible to establish a gear by the oil outputted from the switching valve to allow the vehicle to run even when the regulating valve malfunctions.

In still another aspect, there is provided a system further including: a one-way valve (88) placed between the solenoid valve and the regulating valve for allowing the pressurized oil outputted from the solenoid valve to be supplied to the regulating valve. With this arrangement, it becomes possible to prevent the oil to be supplied to the frictional engaging elements from being drained even when the solenoid valve malfunctions to allow the vehicle to run.

In yet still another aspect, there is provided a system wherein the pressurized oil supplied from the switch valve is applied to both ends of the regulating valve (30, 96) through an orifice. More specifically, there is provided a system wherein the pressurized oil supplied from the switch valve is applied to both ends of the regulating valve (96) through an orifice (100, 102). With this arrangement, it becomes possible to prevent the delay in supply of oil under low temperatures, in-gear shock that could occur under normal oil temperature, engine rev which could occur upon sudden rise in the transmission input speed at the time when the switching valve is switched to supply oil to the frictional engaging elements from the switching valve.

In yet still another aspect, there is provided a system wherein the regulating valve has a spool (30a, 96a) which moves in the regulating valve in a first direction in response to the pressurized oil outputted from the frictional engaging element, and moves in a second direction opposite to the first direction in response to the pressurized oil supplied from the switching valve, a path (68a, 80a) defined by the spool through which the pressurized oil to be supplied to the frictional engaging element is regulated.

In yet still another aspect, there is provided a system further including a spring (30b) for biasing the spool in the first direction.

In yet still another aspect, there is provided a system further including a one-way valve (88) placed between the solenoid valve and the switching valve such that the pressurized oil outputted from the solenoid valve is supplied to the regulating valve only in the first direction.

In yet still another aspect, there is provided a system according to claim 6, the pressurized oil supplied from the switching valve is applied to the spool through an orifice (100, 102) such that the pressurized oil supplied to the spool in the second direction decreases with increasing pressurized oil supplied to the spool in the first direction. It should be noted here that although the characteristic is inverse in the second embodiment, it suffices if the pressurized oil supplied to the spool in the second direction decreases with increasing pressurized oil supplied on the spool in the first direction.

It should be noted in the foregoing embodiments that, even though descriptions have been given for the case in which 1st gear is established by bringing the first clutch K1 into engagement when a malfunction occurs in the solenoid valve SA, the invention is in no way limited to this. For example, the configuration can be modified to establish any other gear using any frictional engaging elements including brakes if a malfunction occurs in any of the other solenoid valves.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for controlling oil pressure of an automatic transmission mounted on a vehicle, including:

a selector lever for selecting one among a plurality of gear ranges in the transmission;

a plurality of frictional engaging elements installed in the transmission for establishing a gear in a gear train in the selected gear range;

an oil pump for pumping oil from an oil reservoir to generate pressurized oil;

a plurality of solenoid valves at least one of which opens to supply the pressurized oil to at least one of the frictional engaging elements;

a switching valve whose spool moves in response to the selection of the selector lever for supplying the pressurized oil to the frictional engaging element outputted from the solenoid valve when the shift lever selects one gear range, while supplying the pressurized oil to the frictional engaging element bypassing the solenoid valve when the selector lever selects another gear range; and a regulating valve placed between the frictional engaging element and the switching valve for regulating pressure of the pressurized oil to be supplied to the frictional engaging element in response to the pressurized oil outputted from the solenoid valve;

wherein the improvement comprises:

the regulating valve regulates the pressure of the pressurized oil to be supplied to the frictional engaging element in response to the pressurized oil supplied from the switching valve.

2. A system according to claim 1, wherein the pressurized oil supplied by the switching valve communicates with the pressurized oil outputted from the frictional engaging element.

3. A system according to claim 1, further including:

a one-way valve placed between the solenoid valve and the regulating valve for allowing the pressurized oil outputted from the solenoid valve to be supplied to the regulating valve.

4. A system according to claim 1, wherein the pressurized oil supplied from the switch valve is applied to both ends of the regulating valve.

5. A system according to claim 4, wherein the pressurized oil supplied from the switch valve is applied to both ends of the regulating valve through an orifice.

6. A system according to claim 1, wherein the regulating valve has:

a spool which moves in the regulating valve in a first direction in response to the pressurized oil outputted from the frictional engaging element, and moves in a second direction opposite to the first direction in response to the pressurized oil supplied from the switching valve;

a path defined by the spool through which the pressurized oil to be supplied to the frictional engaging element is regulated.

7. A system according to claim 6, further including:

a spring for biasing the spool in the first direction.

8. A system according to claim 6, further including:

a one-way valve placed between the solenoid valve and the switching valve such that the pressurized oil outputted from the solenoid valve is supplied to the regulating valve only in the first direction.

9. A system according to claim 6, the pressurized oil supplied from the switching valve is applied to the spool through an orifice such that the pressurized oil supplied to the spool in the second direction decreases with increasing pressurized oil supplied to the spool in the first direction.

10. A method for controlling oil pressure of an automatic transmission mounted on a vehicle, including:

a selector lever for selecting one among a plurality of gear ranges in the transmission;

a plurality of frictional engaging elements installed in the transmission for establishing a gear in a gear train in the selected gear range;

an oil pump for pumping oil from an oil reservoir to generate pressurized oil;

a plurality of solenoid valves at least one of which opens to supply the pressurized oil to the frictional engaging elements;

a switching valve whose spool moves in response to the selection of the shift lever for supplying the pressurized oil to the frictional engaging element outputted from the solenoid valve when the selector lever selects one gear range, while supplying the pressurized oil to the frictional engaging element bypassing the solenoid valve when the selector lever selects another gear range; and a regulating valve placed between the frictional engaging element and the switching valve for regulating pressure of the pressurized oil to be supplied to the frictional engaging element in response to the pressurized oil outputted from the solenoid valve;

wherein the improvement comprises:

regulating the pressure of the pressurized oil to be supplied to the frictional engaging element in response to the pressurized oil supplied from the switching valve.

11. A method according to claim 10, wherein the pressurized oil supplied by the switching valve communicates with the pressurized oil outputted from the frictional engaging element.

12. A method according to claim 10, further including:

a one-way valve placed between the solenoid valve and the regulating valve for allowing the pressurized oil outputted from the solenoid valve to be supplied to the regulating valve.

13. A method according to claim 1, wherein the pressurized oil supplied from the switch valve is applied to both ends of the regulating valve.

14. A method according to claim 4, wherein the pressurized oil supplied from the switch valve is applied to both ends of the regulating valve through an orifice.

15. A method according to claim 1, wherein the regulating valve has:

a spool which moves in the regulating valve in a first direction in response to the pressurized oil outputted from the frictional engaging element, and moves in a second direction opposite to the first direction in response to the pressurized oil supplied from the switching valve;

a path defined by the spool through which the pressurized oil to be supplied to the frictional engaging element is regulated.

16. A method according to claim 6, further including:

spring for biasing the spool in the first direction.

17. A method according to claim 6, further including:

a one-way valve placed between the solenoid valve and the switching valve such that the pressurized oil outputted from the solenoid valve is supplied to the regulating valve only in the first direction.

18. A method according to claim 6, the pressurized oil supplied from the switching valve is applied to the spool through an orifice such that the pressurized oil supplied to the spool in the second direction decreases with increasing pressurized oil supplied to the spool in the first direction.

* * * * *